United States Patent
Mathews et al.

(10) Patent No.: US 11,086,083 B2
(45) Date of Patent: Aug. 10, 2021

(54) OPTICAL CONNECTOR WITH DUST INGRESS MITIGATING COVER

(71) Applicant: 3M INNOVATIVE PROPERTIES COMPANY, St. Paul, MN (US)

(72) Inventors: Alexander R. Mathews, Austin, TX (US); James M. Nelson, Woodbury, MN (US); Terry L. Smith, Roseville, MN (US); Michael A. Haase, St. Paul, MN (US); Lars A. Smeenk, St. Paul, MN (US)

(73) Assignee: 3M INNOVATIVE PROPERTIES COMPANY, St. Paul, MN (US)

(*) Notice: Subject to any disclaimer, the term of this patent is extended or adjusted under 35 U.S.C. 154(b) by 532 days.

(21) Appl. No.: 16/064,575

(22) PCT Filed: Dec. 22, 2016

(86) PCT No.: PCT/US2016/068178
§ 371 (c)(1),
(2) Date: Jun. 21, 2018

(87) PCT Pub. No.: WO2017/116933
PCT Pub. Date: Jul. 6, 2017

(65) Prior Publication Data
US 2020/0284996 A1 Sep. 10, 2020

Related U.S. Application Data

(60) Provisional application No. 62/273,261, filed on Dec. 30, 2015.

(51) Int. Cl.
*G02B 6/38* (2006.01)
*H01R 13/453* (2006.01)

(52) U.S. Cl.
CPC .......... *G02B 6/3849* (2013.01); *G02B 6/383* (2013.01); *G02B 6/3893* (2013.01); *G02B 6/3898* (2013.01); *H01R 13/453* (2013.01)

(58) Field of Classification Search
CPC .... G02B 6/3849; G02B 6/383; G02B 6/3893; G02B 6/3898; H01R 13/453;
(Continued)

(56) References Cited

U.S. PATENT DOCUMENTS 5,348,487 A 9/1994 Marazzi
5,940,560 A 8/1999 De Marchi
(Continued)

FOREIGN PATENT DOCUMENTS

DE 1004911 5/2000
EP 0 114 230 8/1984
(Continued)

OTHER PUBLICATIONS

International Search report for PCT International Application No. PCT/US2016/068178 dated Jul. 12, 2017, 8 pages.

*Primary Examiner* — John Bedtelyon
(74) *Attorney, Agent, or Firm* — Michael Stern

(57) ABSTRACT

An optical connector (100) includes a housing (112) configured to contain one or more optical ferrules (121) disposed within the housing and accessible through an opening at a mating end of the housing. A cover (130) is disposed at the mating end, the cover configured to be rotated about a pivoting axis between a closed position an open position. An actuator (135, 136) is configured to cause the cover to rotate about the pivoting axis from the closed position to the open position.

22 Claims, 20 Drawing Sheets

(58) Field of Classification Search
CPC .............. H01R 13/447; H01R 13/4532; H01R 13/4534; H01R 13/4536; H01R 13/4538
See application file for complete search history.

(56) References Cited

U.S. PATENT DOCUMENTS

| | | |
|---|---|---|
| 6,508,594 B1 | 1/2003 | Bruland |
| 2003/0002816 A1 | 1/2003 | De Marchi |
| 2010/0199477 A1 | 8/2010 | Mercado |
| 2011/0206325 A1 | 8/2011 | Hioki |
| 2012/0155825 A1* | 6/2012 | Ko .................... G02B 6/3849 |
| | | 385/139 |
| 2012/0301081 A1 | 11/2012 | Affre De Saint Rome |
| 2013/0308909 A1 | 11/2013 | Barnette, Jr. |

FOREIGN PATENT DOCUMENTS

| | | |
|---|---|---|
| JP | 60-057807 | 4/1985 |
| JP | 2007-304354 | 11/2007 |
| JP | 2008-225133 | 9/2008 |
| JP | 2010-204525 | 9/2010 |
| JP | 2012-032496 | 2/2012 |
| JP | 2013-113878 | 6/2013 |
| WO | WO 2014-055226 | 4/2014 |
| WO | WO 2017-066018 | 4/2017 |
| WO | WO 2017-066019 | 4/2017 |
| WO | WO 2017-066022 | 4/2017 |
| WO | WO 2017-066024 | 4/2017 |
| WO | WO 2017-066135 | 4/2017 |
| WO | WO 2017-066137 | 4/2017 |
| WO | WO 2017-066139 | 4/2017 |
| WO | WO 2017-066140 | 4/2017 |

\* cited by examiner

OPTICAL CONNECTOR WITH DUST INGRESS MITIGATING COVER

TECHNICAL FIELD

This disclosure relates generally to optical connectors and to optical connector systems.

BACKGROUND

Optical connectors can be used for optical communications in a variety of applications including telecommunications networks, local area networks, data center links, and internal links in computer devices. There is interest in extending optical communication to applications inside smaller consumer electronic appliances such as laptops and even cell phones. Expanded optical beams may be used in connectors for these systems to provide an optical connection that allows alignment tolerances to be relaxed. However, the ingress of dust within the connector housing can cause angular errors for expanded beam and/or other optical interconnect devices that result in suboptimal operation.

BRIEF SUMMARY

Embodiments are directed to an optical connector comprising a housing configured to contain one or more optical ferrules disposed within the housing and accessible through an opening at a mating end of the housing. A cover is disposed at the mating end, the cover configured to be rotated about a pivoting axis between a closed position an open position. At least one cover opening actuator is disposed within the housing when the cover is in the closed position and extending at least partially from the opening in the housing when the cover is in the open position. The actuator, when extending at least partially from the opening, is configured to engage with an internal face of the cover to cause the cover to rotate about the pivoting axis from the closed position to the open position.

According to some embodiments, an optical connector includes a housing configured to contain one or more optical ferrules disposed within the housing proximate to an opening at a mating end of the housing. At least one track may be disposed, for example, in the housing. A cover is disposed across the opening at the mating end when the cover is in a closed position. The cover configured to bend or hinge along the track as the cover moves from the closed position in which the cover covers the opening to an open position in which the opening is exposed. A cover opening feature is coupled to the cover and is configured to be operated to cause the cover to move from the closed position to the open position.

Some embodiments are directed to an optical connector comprising a housing configured to contain one or more optical ferrules disposed within the housing proximate to an opening at a mating end of the housing. The connector includes a fan fold cover comprising at least two fan sections with a hinge between the two fan sections. One of the two fan sections is attached to the housing at a pivoting axis.

According to some embodiments, an optical connector comprises a housing configured to contain one or more optical ferrules disposed within the housing proximate to an opening at a mating end of the housing. At least one cover is disposed at the mating end, the cover comprising a first section that extends along a first side of the housing and a second section disposed at an angle to the first section, the second section extending across the opening when the cover is in the closed position. A cover opening mechanism is configured to move the cover from the closed position in which the second section extends across the opening to an open position in which the cover rotates away from the first side to expose the opening.

Some embodiments include an optical connector comprising a housing configured to contain one or more optical ferrules disposed within the housing proximate to an opening at a mating end of the housing. A revolving cylindrical cover is disposed at the mating end. A cover opening mechanism is configured to revolve the cover from the closed position in which a solid portion of the revolving cover extends across the opening to an open position in which the opening is exposed.

Embodiments disclosed herein involve an optical connector comprising a housing configured to contain one or more optical ferrules disposed within the housing and accessible through an opening at a mating end of the housing. A cover is disposed at or near the mating end. The cover is configured to be rotated about a pivoting axis between a closed position in which the opening is covered by the cover and an open position in which the opening is exposed. A cover opening mechanism includes a lever extending outside the housing. Rotation of the lever causes the cover to rotate about the pivoting axis from a closed position in which the cover extends across the opening to an open position in which the opening is exposed.

According to some embodiments, an optical connector system includes a male connector and a female connector. The male connector comprises a housing configured to contain one or more optical ferrules disposed within the housing and accessible through an opening at a mating end of the housing. A cover is disposed at or near the mating end of the male connector. The cover is configured to be rotated about a pivoting axis between a closed position in which the opening is covered by the cover an open position in which the opening is exposed. A cover opening mechanism including a lever extends outside the male connector housing. Rotation of the lever causes the cover to rotate about the pivoting axis from a closed position in which the cover extends across the opening to an open position in which the opening is exposed. The female connector includes a housing dimensioned to receive at least a mating end portion of the housing of the male connector. The female connector housing is configured to contain one or more optical ferrules disposed within the female housing and accessible through an opening at the mating end of the female housing. During mating of the male connector and the female connector, a portion of a mating end edge of the housing of the female connector is an actuator configured to engage the lever to cause the cover to rotate about the pivoting axis from the closed position to the open position.

Some embodiments include an optical connector system comprising male and female optical connectors. The male optical connector includes a male connector housing having an opening at a curved mating end of the male connector housing. The male connector housing configured to contain one or more optical ferrules disposed within the male connector housing and accessible through the opening. The mating end of the male connector housing is curved. The female optical connector includes a female housing having an opening configured to receive the curved mating end of the housing of the male connector. The female connector housing is configured to contain one or more optical ferrules disposed within the housing and accessible through the opening. A cover extends across the opening of the female housing when the cover is in the closed position. The cover is configured to be rotated about a pivoting axis when moving from the closed position to an open position. The curved mating end of the housing of the male connector configured to engage with an outer surface of the cover to cause rotation of the cover from the closed position to the open position during mating.

According to some embodiments, an optical connector system includes male and female optical connectors. The male optical connector includes a male housing having an opening at a mating end of the male housing. The male housing is configured to contain one or more optical ferrules disposed within the male housing and accessible through the opening. The female optical connector includes a female housing having an opening configured to receive the mating end of the housing of the male optical connector. The female housing is configured to contain one or more optical ferrules disposed within the female housing and accessible through the opening. A cover extends across the opening of the female housing when the female housing is in the closed position. An outer surface of the cover is configured to engage the mating end of the male housing and to be rotated about a pivoting axis when moving from the closed position to an open position as the male housing is inserted into the female housing. At least one of the cover and the mating end of the male housing is curved and forms a cam that reduces the variability in mating force of the male and female optical connectors.

Some embodiments are directed to an optical connector comprising a housing having an interior volume configured to contain one or more optical ferrules. The housing includes an opening at a mating end of the housing. A male housing portion includes a male portion mating end and a male portion rear end. A female housing portion includes a female portion mating end and a female portion rear end. There is a slot between the male and female portions that separates the mating ends of the male and female portions. The slot extends partially from the male and female mating ends to the male and female rear ends. The slot is configured to interlock the connector with a mating connector of substantially similar construction when the connector and the mating connector are mated.

According to some embodiments, a device comprises a cap dimensioned to fit over, within, or both over and within an opening of a housing of an optical connector. The housing of the optical connector is configured to contain one or more optical ferrules. A handle configured to be attached to an external surface of the cap. A release mechanism is configured to release the cap from the handle.

Some embodiments involve an optical connector assembly. comprising an optical connector having a housing configured to contain one or more optical ferrules disposed within the housing and accessible through an opening at a mating end of the housing. A cover extends across the opening at or near the mating end. A cap is disposed over the cover. The cap includes a release feature configured to release the cap from a handle that facilitates positioning of the cap.

BRIEF DESCRIPTION OF DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION OF ILLUSTRATIVE EMBODIMENTS

Embodiments described herein involve optical connectors and connector systems that mitigate the ingress of dust into the connector housing. Optical connectors are useful for connecting optical waveguides to optical waveguides or to optoelectronic components for in-line interconnects and/or printed circuit board (PCB) connections, e.g., backplane connections. Optical connectors used in many applications may make use of one waveguide or allays of multiple parallel waveguides (typically 4, 8 or 12 or more parallel waveguides). The individual waveguides are typically made of glass with a protective buffer coating, and the parallel waveguides are enclosed by a jacket.

One type of connector is an expanded beam connector, in which light is coupled between waveguides in a beam that is larger in diameter than the core of an associated optical waveguide and typically somewhat less than the waveguide-to-waveguide pitch. The waveguides may comprise optical fibers, e.g., single mode or multi-mode fibers. These expanded beam optical connectors can have non-contact optical coupling and can require reduced mechanical precision when compared with conventional optical connectors. Generally, an expanded beam is a beam that is larger in diameter than the core of an associated optical waveguide (usually an optical fiber, e.g., a multi-mode fiber for a multi-mode communication system). The connector is generally considered an expanded beam connector if there is an expanded beam at a connection point. The expanded beam is typically obtained by diverging a light beam from a source or optical fiber. In many cases, the diverging beam is processed by optical elements such as a lens or mirror into an expanded beam that is approximately collimated. The expanded beam is then received by focusing of the beam via another lens or mirror.

Optical interconnect devices including expanded beam devices are sensitive to angular errors that can be caused by the presence of dust between alignment surfaces of mating connectors. For example, expanded-beam optical interconnect devices may be sensitive to angular errors on the order of 0.1 degrees. For example, the planar interface between optical ferrules illustrated below can be about 3 mm long. If a single 50 µm diameter dust particle is trapped in the interface between two mated optical ferrules, the dust particle would generate an angular error of 1 degree or larger, thereby decreasing optical transmission efficiency. Some embodiments described herein are directed to a covers, caps, plugs, and/or other dust mitigating components and features configured to reduce the introduction of dust and/or to mitigate the effects of dust within the connector housing.

FIGS. 1A through 1E provide various views of an optical connector that includes a dust ingress mitigating cover. FIG. 1F illustrate a system of optical connectors wherein each connector in the connector system has a dust ingress mitigating cover.

Figure 1A:
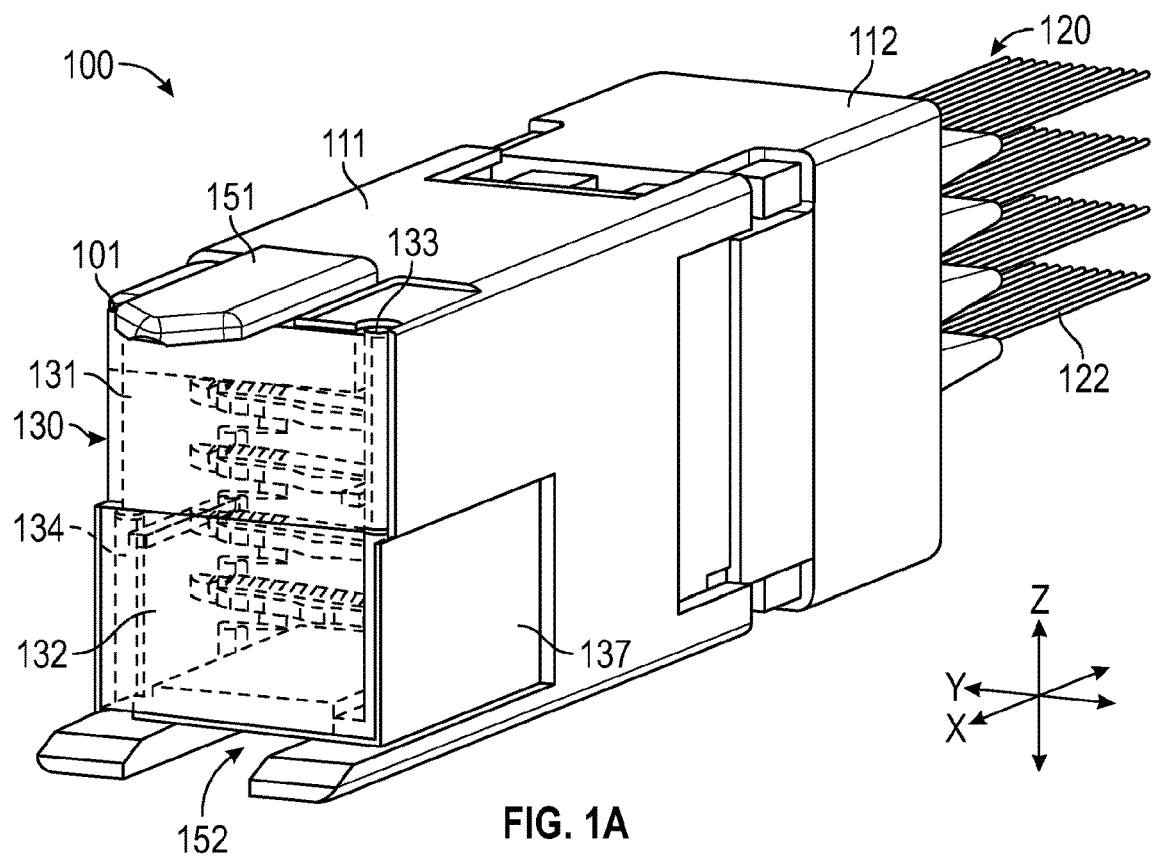
FIGS. 1A through 1E provide various views of an optical connector that includes a dust ingress mitigating cover in accordance with some embodiments.
Figure 1B:
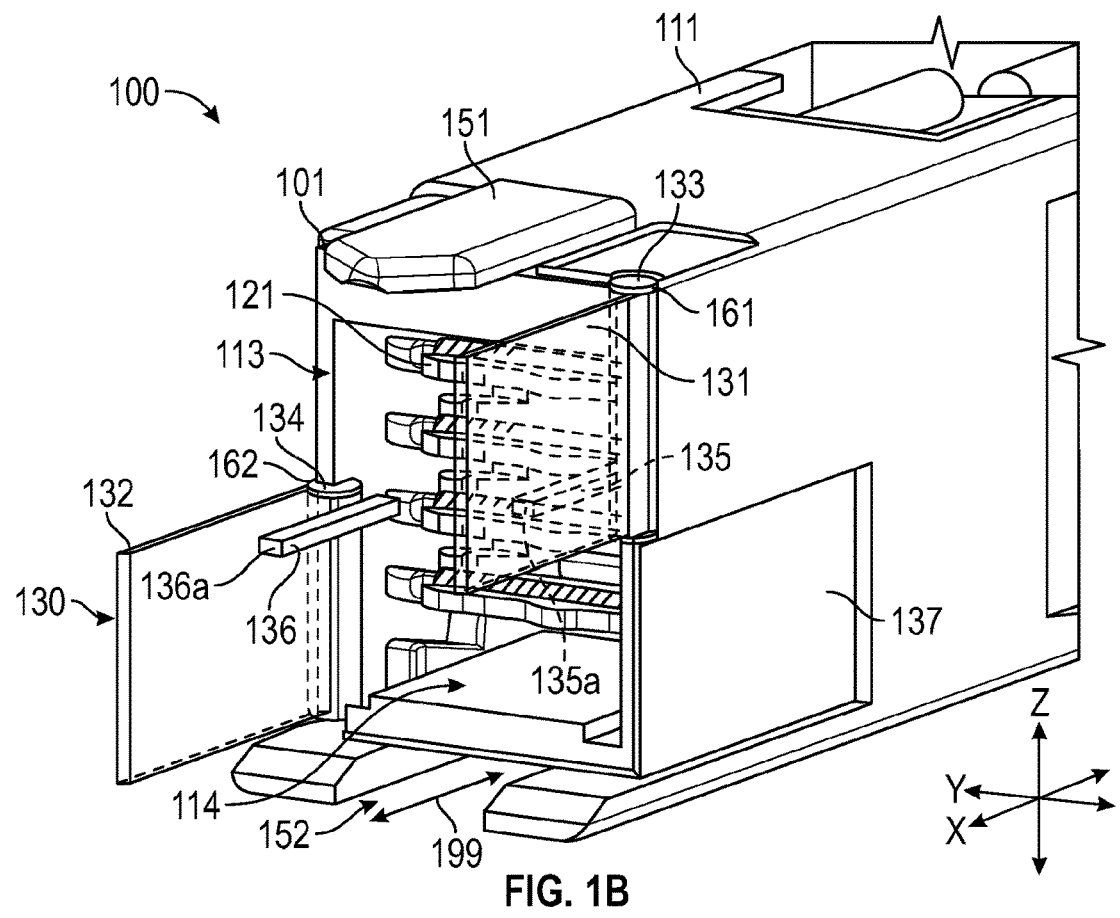
Figure 1C:
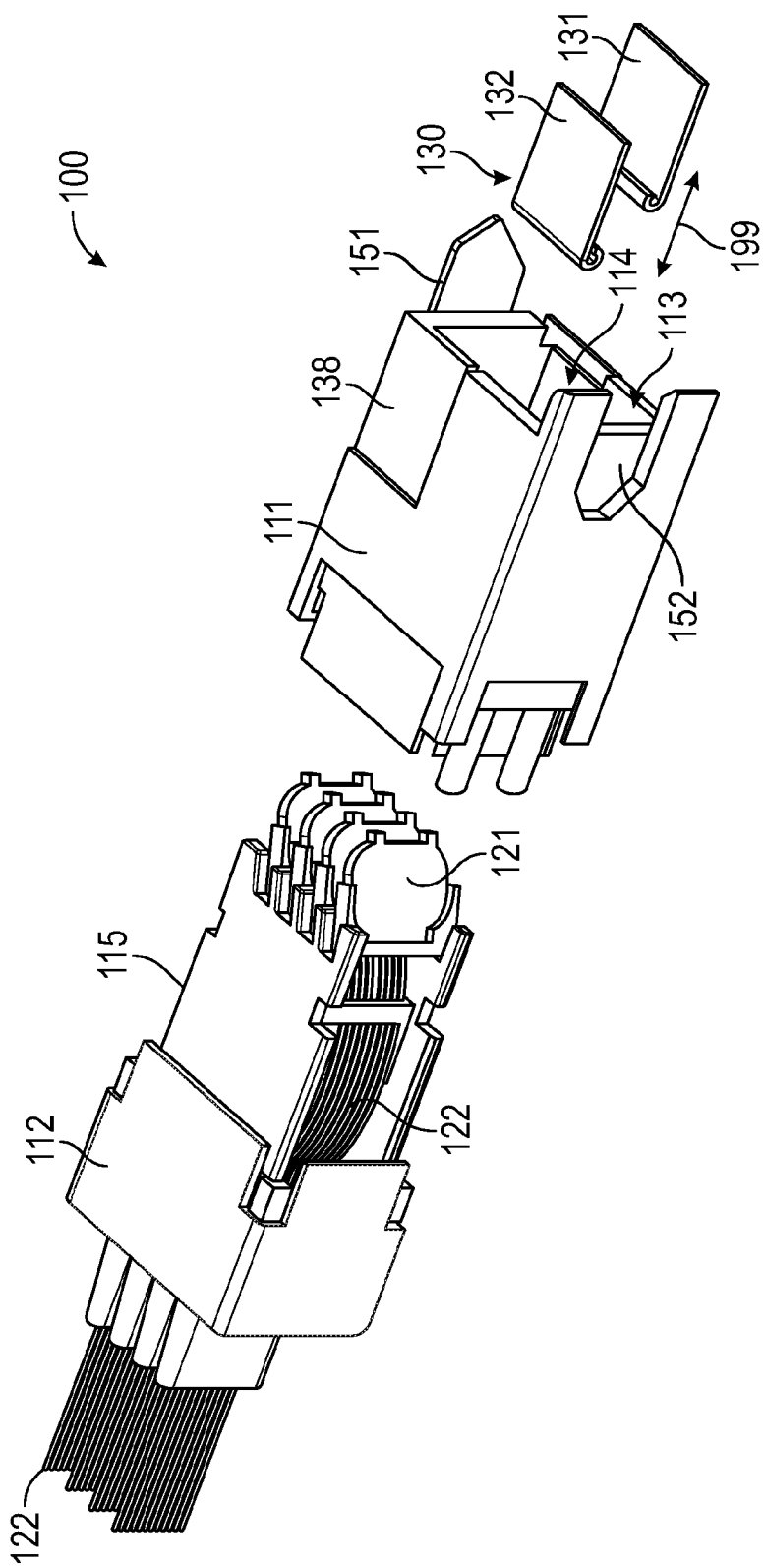
Figure 1D:
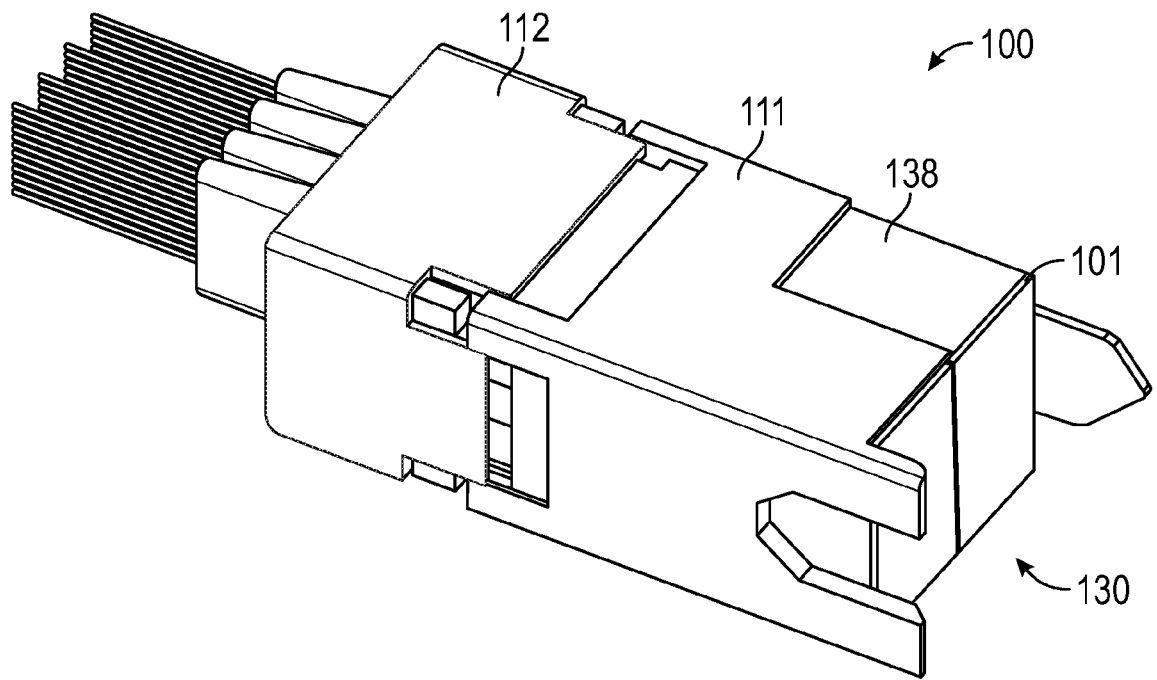
Figure 1E:
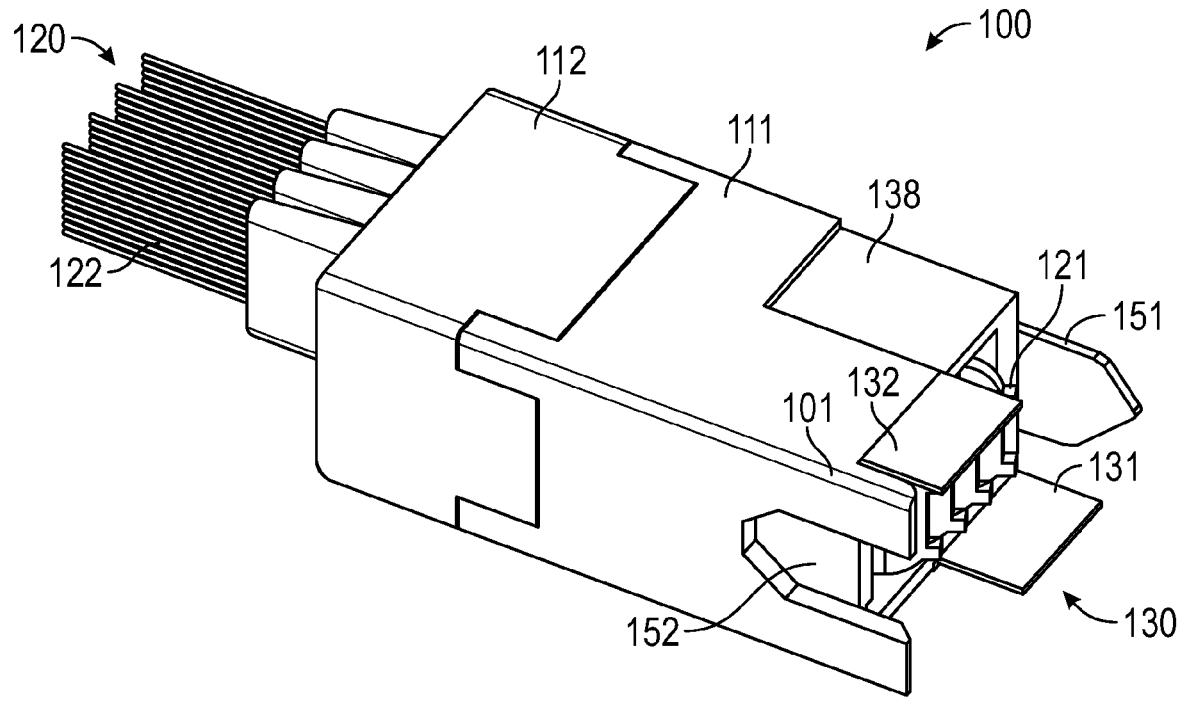
Figure 1F:
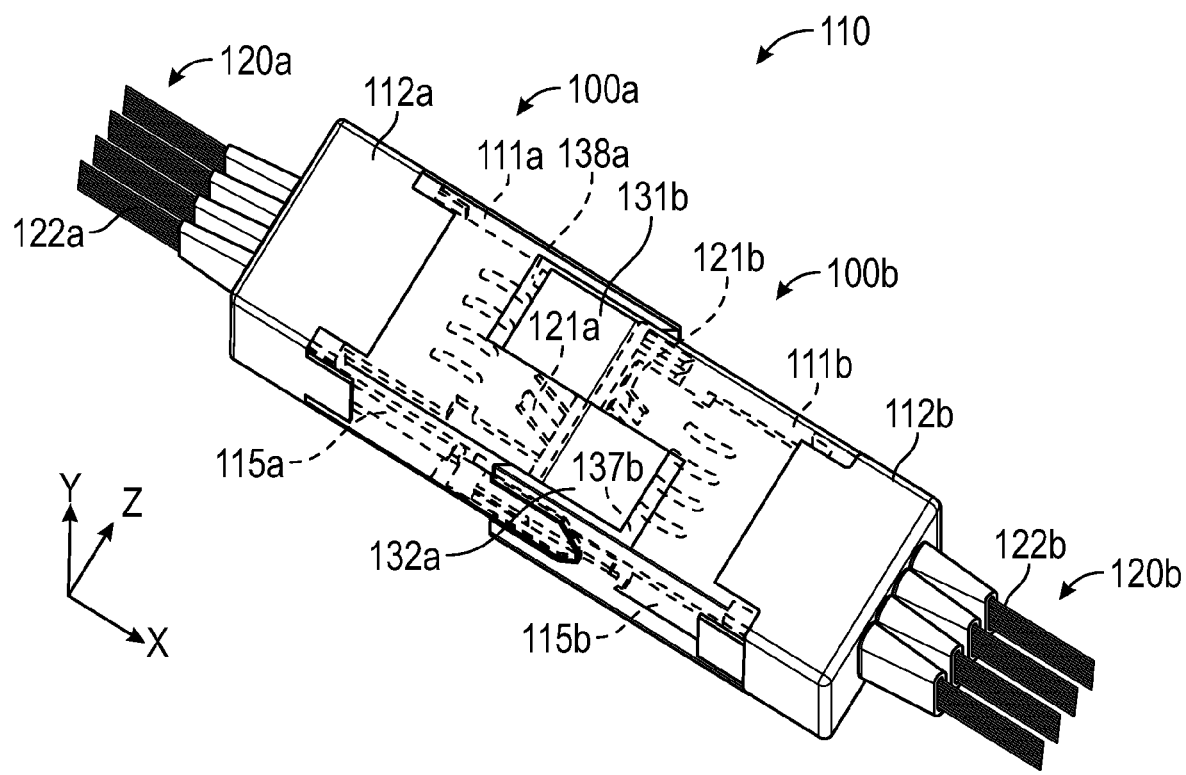
FIG. 1F illustrates an optical connector system comprising two optical connectors, each optical connector having a dust ingress mitigating cover in accordance with some embodiments.

Optical connector 100 depicted in FIGS. 1A through 1E incorporates a dust ingress mitigating cover 130 configured to reduce the introduction of dust into the connector housing 110 in accordance with some embodiments. FIGS. 1A and 1B show the cover 130 as partially transparent so that other structures of the connector 100 are visible. FIG. 1C is an exploded view showing various structures of the connector 100. FIG. 1D shows the connector 100 with the cover 130 in the closed position. FIG. 1E shows the connector 100 with the cover 130 in the open position. FIG. 1F shows an optical connector system comprising first and second connectors 100a, 100b that are mated.

Optical connector 100 includes a housing 110 that includes a forward housing 111 and a rear housing 112. The forward and rear housings 111, 112 are capable of moving relative to one another. For example, the forward housing 111 is capable of being pulled back towards the rear housing 112 in some embodiments. The housings 111, 112 have an interior volume 114 configured to contain a portion of one or more optical cables 120. Each optical cable 120 comprises an optical ferrule 121 attached to one or more optical waveguides 122. In various embodiments, each optical ferrule may be attached to a single waveguide or each optical ferrule may be attached to an array of waveguides. Features configured for coupling the optical waveguides to the ferrules are further discussed in commonly owned U.S. Patent Application identified by 62/240,009 entitled "Optical Waveguide with Registration Feature" and commonly owned U.S. Patent Application identified by 62/240,002 entitled "Optical Ferrules with Waveguide Inaccessible Space" both of which are incorporated herein by reference. In the illustrated embodiments of FIGS. 1A through 1F, the optical cables 120 are arranged so that the optical waveguides 122 are bent within the housing 110. The bend in the optical waveguides 122 provides a mating spring force that maintains the optical ferrule 121 in a mating arrangement with a mating optical ferrule.

The optical connector 100 includes a cover 130 that includes two covers 131, 132. configured to mitigate dust ingress into the housing 111, 112. Additional techniques to mitigate the effects of dust are disclosed in commonly owned U.S. Patent application identified by 62/240,000 entitled "Dust Mitigating Optical Connector," which is incorporated herein by reference. Techniques for molding ferrules, including those that include dust mitigating features, are described in commonly owned U.S. Patent Application identified by 62/239,996 entitled "Optical Ferrules and Optical Ferrule Molds" which is incorporated herein by reference.

The optical ferrules 121 are accessible through an opening 113 at a mating end 101 of the connector 100. When in a closed position, the cover 130 extends across the opening 113 of the forward housing 111 and prevents dust from entering the interior volume 114 of the connector 100. The cover 130 shown in FIGS. 1A through 1F comprises first and second covers 131, 132, wherein each cover 131, 132 extends across and covers a different region of the opening 113. It will be appreciated that in other embodiments, the cover may be only one single cover or may comprise more than two covers.

The first and second covers 131, 132 extend across the opening 113 in the forward housing 111 and may overlap slightly where they come together, making the entry path for dust more of a tortuous passageway. In some embodiments, the overlapped surface of the covers, and/or other surfaces between the covers and the housing may be a sealing surface and/or may include a compliant material such as a gasket or o-ring to reduce dust ingress. Each cover 131, 132 is configured to be rotated about a pivoting axis at pins 133, 134 between the closed position, wherein the first and second covers 131, 132 extend along the y axis across the opening 113, and an open position in which the covers 131, 132 extend along the mating axis 199 (the x-axis in FIGS. 1A and 1B). The first and second covers 131, 132 are illustrated as rotating in opposite directions about the pivoting axes 133 134, however, in some embodiments, the covers may rotate in the same direction as they move from the closed to the open position.

In some embodiments, as best seen in the exploded view of the connector 100 shown in FIG. 1C, the optical connector 100 includes an inner frame 115 that is attached to the rear housing 112. The inner frame 115 may include features configured to hold the optical cables 120 within the frame, facilitating bending of the optical waveguides 122 to provide the mating spring force for the optical ferrules 121. Configurations optical cable subassemblies that include a cable retainer and frames configured to receive the cable retainer are disclosed in commonly owned U.S. patent application identified by 62/240,008 entitled "Optical Assembly with Cable Retainer," which is incorporated herein by reference. The inner frame 115 can be attached to the rear housing 112 and may move inside the interior volume 114 of the forward housing 111. Relative movement of the forward housing 111 and rear housing 112 along the mating axis 199 causes the covers 131, 132 to move from the closed position to the open position. For example, pulling the forward housing 111 back along the mating axis 199 towards the rear housing 112 opens the covers 131, 132 and exposes the optical ferrules 121 through the opening 113. As the forward housing 111 is pulled back relative to the rear housing 112, an end 135a, 136b of each cover actuator 135, 136 engages with the internal surface of a cover 131, 132. As the actuators 135, 136 continue to move along the mating axis 199 due to the movement of the forward housing 111 towards the rear housing 112, the actuators 135, 136 apply force to the internal surfaces of the covers 131, 132 causing the covers 131, 132 to rotate around their respective pivoting axes 133, 134. In the embodiment illustrated in FIGS. 1A through 1F, the rotational direction of the first cover 131 when moving from the closed position to the open position is opposite from the rotational direction of the second cover 132 when moving from the closed position to the open position. The relative movement of the forward and rear housings 111, 112 also causes the optical ferrules 121 to move into a mating position, e.g. protruding slightly from the opening 113. In some embodiments, the connector 100 optionally includes one or more springs e.g., torsion springs 161, 162, that bias the covers 131, 132 toward the closed position. The springs may be compression springs, extension springs, or torsion springs as discussed below.

The forward housing 111 optionally includes features 151, 152 that provide rough alignment for the connector 100 during mating. In FIGS. 1A through 1F, feature 151 is a pin that fits in a slot of a mating connector and feature 152 is a slot that receives a pin of a mating connector. In some embodiments each cover 131, 132 slides into a recess of the mating connector wherein engagement of the covers 131, 132 in the recesses of the mating connector and/or engagement of the covers of the mating connector with recesses 137, 138 of the connector 100 provides a rough alignment for the connectors during mating.

FIG. 1F shows an optical connector system 110 that includes two mated connectors 100a, 100b. The connectors 100a, 100b include forward 111a, 111b and rear 112a, 112b housings. The housings 111a, 111b, 112a, 112b support and/or contain optical cables 120a, 120b comprising optical ferrules 121a, 121b attached to waveguides 122a, 122b. In FIG. 1F, the forward housings 111a, 111b are transparent allowing a portion of the inner frames 115a, 115b and a portion of the ferrules 121a, 121b to be visible. Connector 100a includes a recess 138a in the forward housing 111a that is configured to receive the cover 131b of the mating connector 100b when the connectors 100a, 100b are in the mated position. Connector 100b includes a recess 137b in the forward housing 111b that is configured to receive the cover 132a of the connector 100a when the connectors 100a, 100b are in the mated position.

In the embodiment shown, connectors 100a, 100b are hermaphroditic connectors, each being substantially similar or identical to the other, having both male and female features. Each of the connectors 100a, 100b has two covers. Alternatively, in some embodiments, the connectors may be gendered rather than hermaphroditic. In a gendered embodiment, the housing of the male connector may fit inside the housing of the female connector. In some embodiments, only one of the connectors in a connector system has a cover. One of the connectors may be configured as a backplane connector having hardware to secure the connector to a backplane that supports and interconnects optical and/or optoelectronic electronic components (see, e.g., FIG. 12A). In some embodiments, the mated connectors may be held in the mated position by a latch. Latches that are particularly useful for hermaphroditic connectors are disclosed in commonly owned U.S. Patent Application 62/239,996 entitled "Optical Ferrules and Optical Ferrule Molds" which is incorporated herein by reference. Dust ingress mitigating covers as described herein are suitable for uses with configurable connectors as described in commonly owned U.S. Patent Application identified by 62/240,003 entitled "Configurable Optical Connectors" and incorporated herein by reference. Dust ingress mitigating covers as described herein are suitable for uses with hybrid connectors as described in commonly owned U.S. Patent Application identified by 62/240,005 entitled "Hybrid Connectors" and incorporated herein by reference.

Figure 2A:
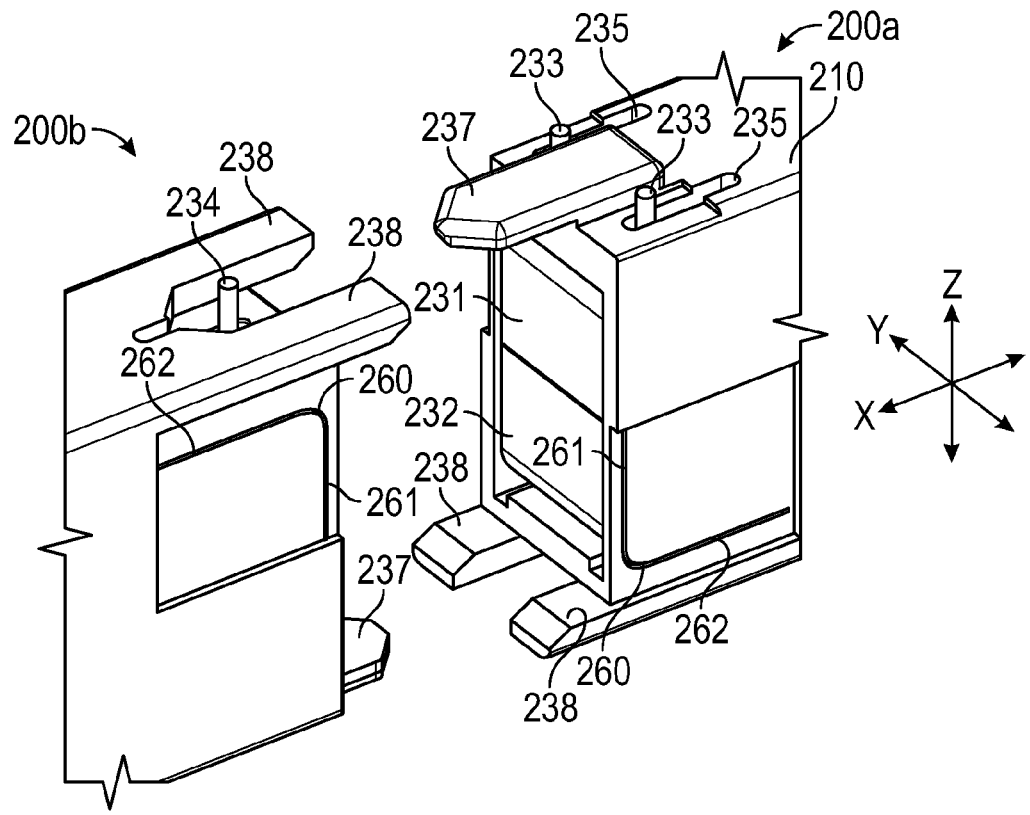
FIGS. 2A through 2D illustrate a "garage door type" dust ingress mitigating cover configuration in accordance with some embodiments.
Figure 2B:
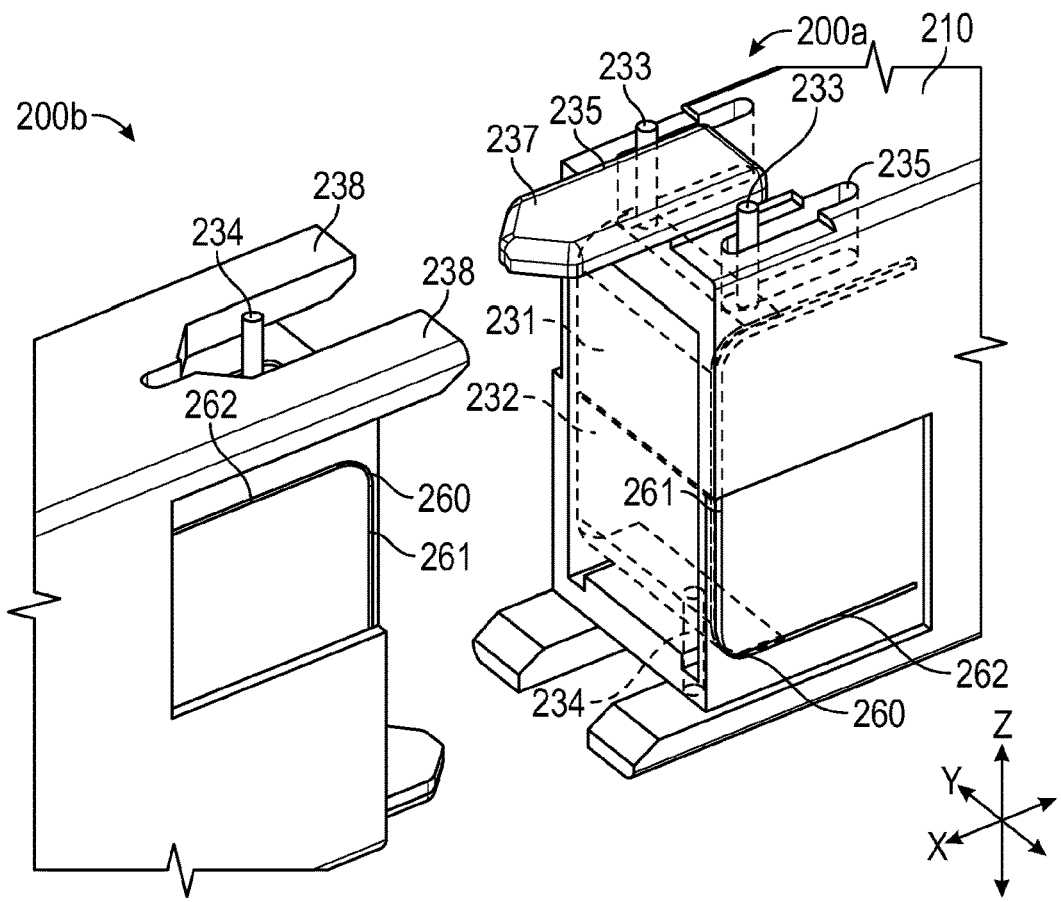
Figure 2C:
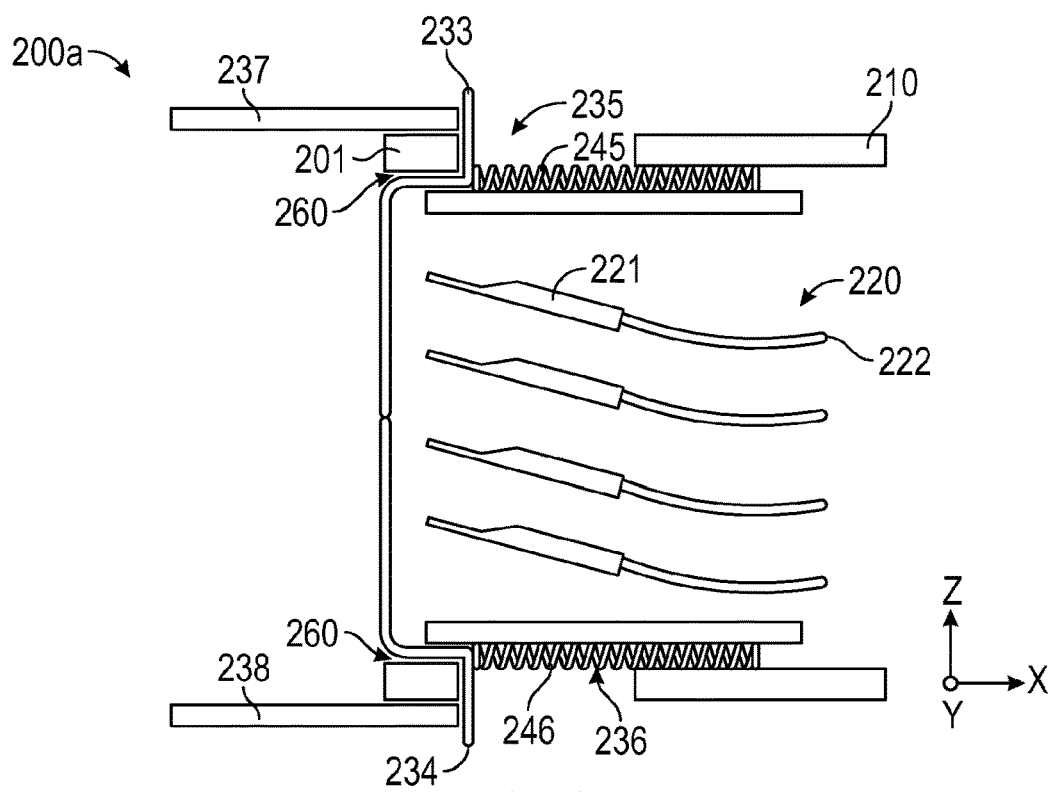
Figure 2D:
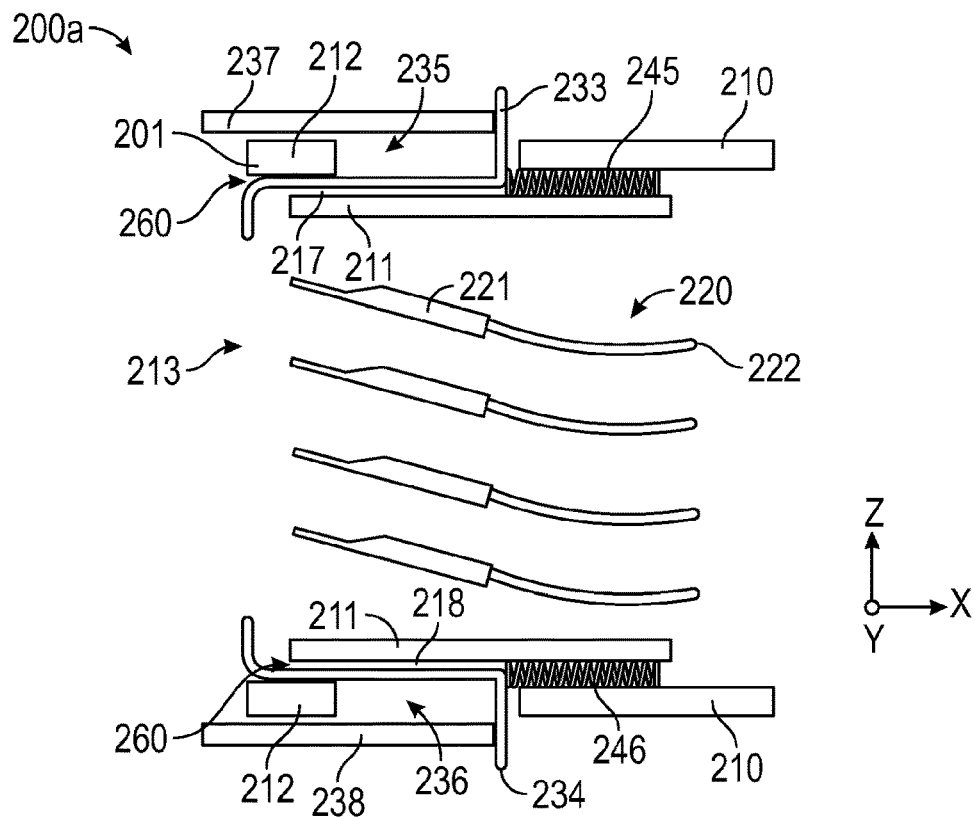

FIGS. 2A through 2D illustrate another dust ingress mitigating cover configuration in accordance with some embodiments. FIG. 2A provides a perspective view of a connector 200a and an identical mating connector 200b, wherein the view of connector 200a shows dust mitigating covers 231, 232 that are referred to herein as "garage door type" dust mitigating covers because the way that the covers 231, 232 open and close is similar to a garage door. Although two garage type covers 231, 232 are shown in FIGS. 2A through 2D, it will be appreciated that, in some embodiments, only one the garage door type cover extends across the opening of the connector housing. In the embodiments illustrated by FIGS. 2A through 2D, each cover 231, 232 extends part way across the opening 213, meeting and/or in some implementations overlapping at about the midpoint of the opening 213. In some embodiments the covers may meet at a point that is not the midpoint, e.g., the covers need not be symmetrical. The covers 231, 232 may be made of a flexible material, such as polypropylene, or may be a segmented sheet with the segments hinged together. A sealing surface and/or flexible material, e.g., a gasket, may be provided where the covers meet. The covers 231, 232 bend or hinge along tracks 260 as the covers 231, 232 move from the closed to the open position. FIG. 2B provides a partially transparent view of connector 200a that shows components of the mechanism for opening the covers 231, 232. FIGS. 2C and 2D show simplified schematic cross sectional diagrams of the optical connector 200a when the cover is in the closed position (FIG. 2C) and open position (FIG. 2D).

Optical connector 200a includes a housing 210 within which one or more optical cables 220 are disposed (The optical cables are not shown in FIGS. 2A and 2B but are schematically illustrated in FIGS. 2C and 2D). Each optical cable 220 includes one or more optical ferrules 221 disposed within the housing 210 proximate an opening 213 at a mating end 201 of the housing 210. Each optical ferrule 221 is attached to one or more waveguides 222 that extend from the rear of the housing 210.

The optical connector 200a includes one or more tracks 260 that may be formed in a side of the housing 210 as illustrated in FIGS. 2A and 2B. Each side of the cover 231, 232 proximate the tracks 2650 may include a feature, such as an edge or a pin, disposed to run along the track 260. The feature, e.g., track edge, moves along the track 260 as the cover 231, 232 is opened and closed. The cover 231, 232 is disposed across the opening 213 at the mating end 201 of the housing 210 when the cover 231, 232 is in the closed position as shown in FIGS. 2A-2C. The cover 231, 232 is configured to bend or hinge along the track 260 as the cover 231, 232 moves from the closed position in which the cover extends across the opening 213 to an open position in which the ferrules 221 are exposed and accessible. In some embodiments, a first portion 261 of the track 260 extends along a first axis, e.g., the z axis in FIGS. 2A and 2B, and a second portion 262 of the track 260 extends along a second axis, e.g., the x axis in FIGS. 2A and 2B, wherein the second axis is disposed at an angle, e.g., about 90 degrees, with respect to the first axis.

The connector 200a includes cover opening features 233, 234 respectively coupled to the covers 231, 232. Each cover opening feature 233, 234 is configured to engage with an actuator 237, 238 of a mating connector 200b during mating of the connector 200a with the mating connector 200b. Engagement of the opening features 233 of the connector with actuators 237 of the mating connector 200b causes the cover 231 to move from the closed position to the open position during mating of the connector 200a with a mating connector 200b. Engagement of the opening feature 234 of the connector with actuator 238 of the mating connector 200b causes the cover 232 to move from the closed position to the open position during mating of the connector 200a with a mating connector 200b.

In some embodiments, the connector 200a includes at least one spring 245, 246, e.g. a compression spring or other type of spring, arranged to bias the cover 231, 232 toward the closed position. In some embodiments, the spring is absent and/or the connector is arranged so that gravity biases the cover toward the closed position. A gravity-biased cover may include a weight, e.g., at a free edge of the cover, to assist in biasing the cover toward the closed position. In some embodiments, the housing is an injection molded housing and the weight is metal or other relatively dense material embedded in the injected molded housing.

As illustrated in FIGS. 2A through 2D, the cover 231, 232 is mechanically coupled to cover opening features 233, 234 that protrude through slots 235, 236 in the housing 210. In the embodiments shown, the opening features 233, 234 are pushed away from the mating end 201 towards the rear end of the connector 200a along the x-axis causing the covers 231, 232 to slide along the tracks 260 and move into the open position. The opening features 233, 234 may be located at opposite edges of the cover 231, 232 and/or in the center of the cover 231, 232, for example.

In some embodiments, the tracks 260 are grooves formed in the inner surfaces of opposing sides of the connector housing 210 as best seen in FIG. 2B. When the cover 231, 232 is in the open position, an outer surface of the cover 231, 232 faces an inner surface of the housing 210. In some embodiments, the cover 231, 232, when in the open position fits inside a pocket 217, 218 within the housing 210 such the cover 231, 232 is sandwiched between an inner 211 and outer 212 wall of the housing 210 (see FIG. 2D). Sandwiching the cover 231, 232 in the pocket 217, 218 traps dust between the inner 211 and outer walls 212, reducing dust ingress into the interior volume of the housing 210 during opening and closing of the cover 231, 232.

As shown in FIGS. 2A and 2B, actuators 237, 238 of a mating connector 200b engage with the cover opening features 233, 234 of the connector 200a to slide the cover 231, 232 along the track 260 from the closed position to the open position. For example, connector 200a has one actuator 237 on the top side of the connector 200a and two actuators 238 on the bottom side of the connector 200a where "top" and "bottom" are terms used for convenience to describe the connector 200a as it is oriented in FIGS. 2A and 2B. The connector 200a and the mating connector 200b may be similar or identical in configuration and may be hermaphroditic. In addition to applying force to the cover opening features 233, 234, the actuators 237, 238 may provide rough alignment for the mating connectors 200a.

Figure 3A:
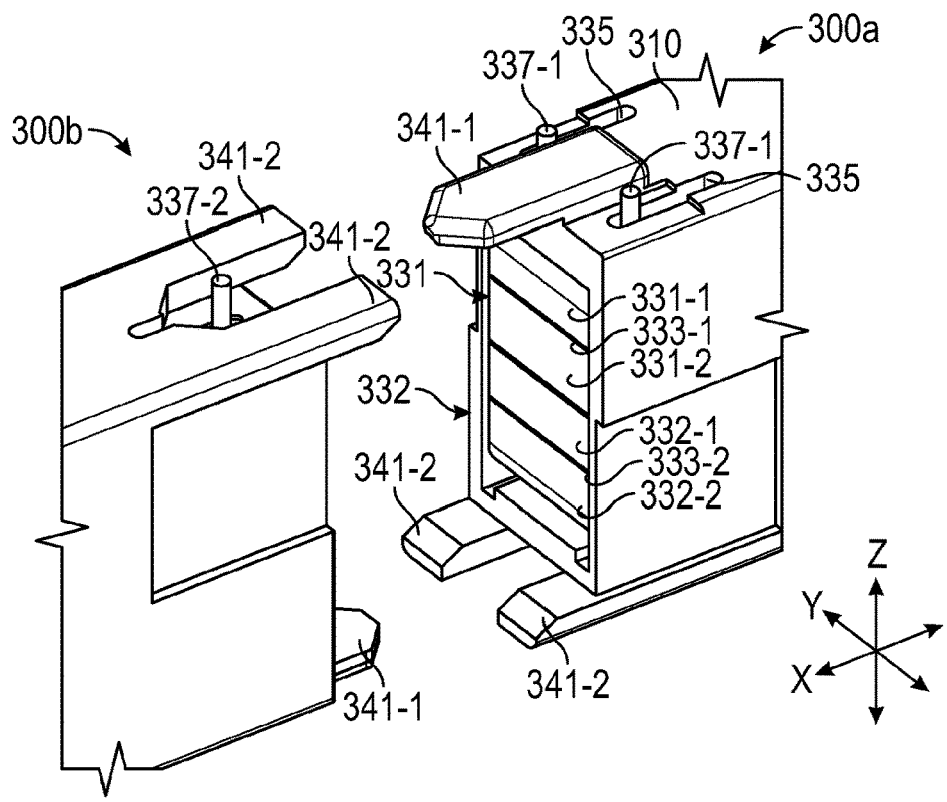
FIGS. 3A through 3C illustrate a "fan fold type" dust ingress mitigating cover configuration in accordance with some embodiments.
Figure 3B:
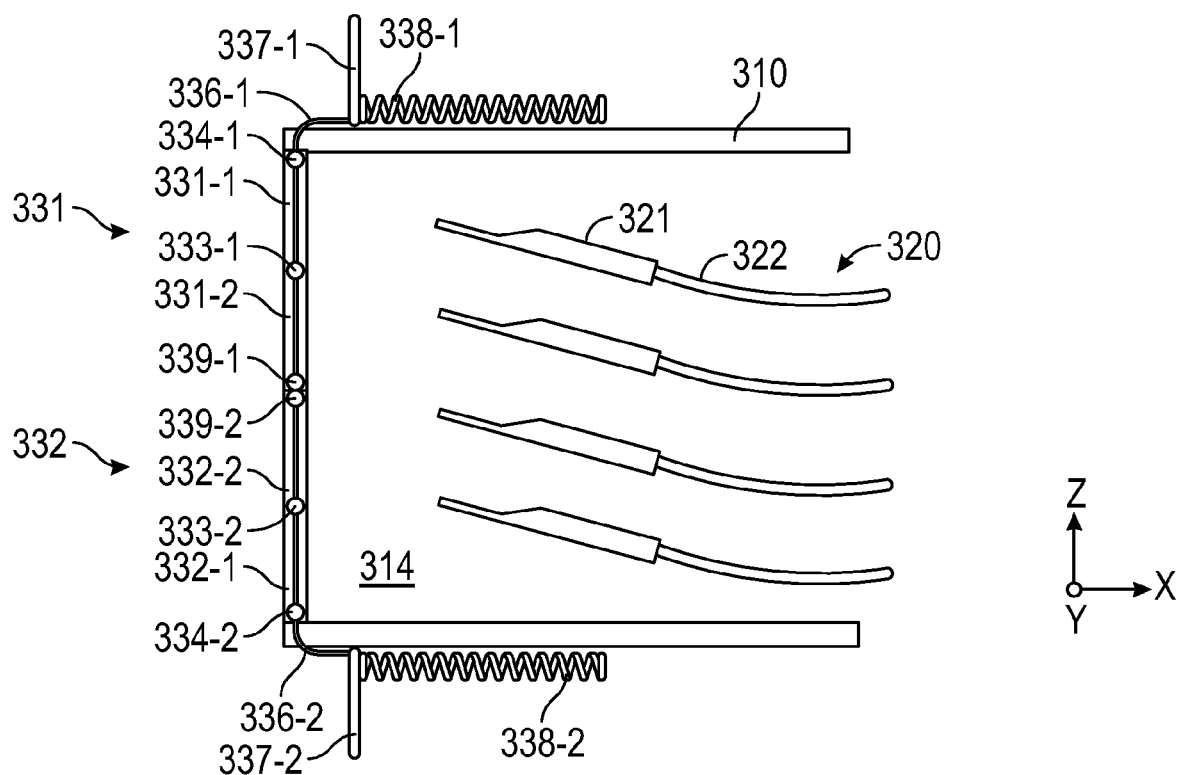
Figure 3C:
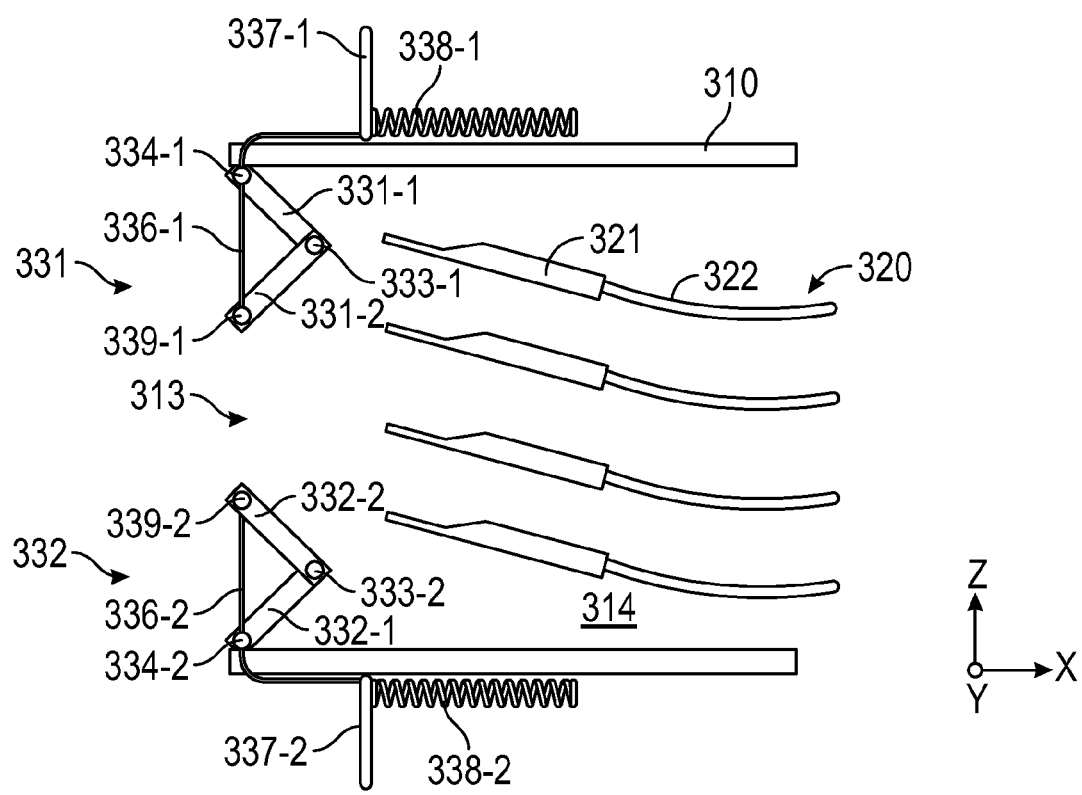

FIGS. 3A through 3C illustrate another dust ingress mitigating cover configuration in accordance with some embodiments. FIG. 3A shows a connector 300a and an identical mating connector 300a. The connectors 300a, 300b includes a housing 310 having optical cables 320 disposed within an interior volume 314 of the housing 310 (see FIGS. 3B and 3C). The optical cables 320 include one or more ferrules 321, each ferrule 321 having one or more waveguides 322 attached thereto. FIG. 3A provides a perspective view of the connector 300a and identical mating connector 300b. FIGS. 3B and 3C are simplified schematic cross sectional views that illustrate how the covers 331, 332 move from the closed position to the open position. FIG. 3B shows the covers 331, 332 in the closed position and FIG. 3C shows the covers 331, 332 in a partially open position. The dust ingress mitigating covers 331, 332 are referred to herein as "fan fold type" dust ingress mitigating covers because the way that the covers 331, 332 open and close may be considered to be similar to the folding of a fan. In some embodiment, only one fan fold type cover extends across the opening 313 in the housing 310. In the embodiments illustrated by FIGS. 3A through 3C, two fan-fold-type covers 331, 332 extend part way across the opening 313 meeting and/or in some implementations overlapping at about the midpoint of the opening 313. A gasket or other sealing surface may be located where the covers meet and/or at other gaps that could allow dust ingress.

The covers 331, 332 are segmented, each cover 331, 332 comprising two segments 331-1, 331-2, 332-1, 332-2 although more segments are possible for each cover. The covers may not be symmetrical as shown, e.g., one cover may have more segments or longer segments than the other cover. Segments 331-1 and 331-2 and segments 332-1 and 332-2 are respectively connected by a hinge 333-1, 333-2. The first segment 331-1, 332-1 of each cover 331, 332 is configured to rotate around a pivoting axis 334-1, 334-2, e.g., the pivoting axis may be a pin coupled to the housing 310 for example.

In some embodiments, as illustrated in FIGS. 3B and 3C, each cover 331, 332 is coupled at an attachment point 339-1, 339-2 to a cover opening feature 337-1, 337-2 through a linkage 336-1, 336-2. As the cover opening feature 337-1, 337-2 moves back away from the opening 313 along the x axis, the linkage 336-1, 336-2 applies a force along the z axis to the cover 331, 332 at the attachment point 339-1, 339-2, moving the bottom of the cover 331, 332 and causing the cover 331, 332 to bend inward at the hinge point 333-1, 333-2. When the cover 331 is fully open, the outer surfaces of the segments 331-1, 331-2 are disposed against each other and when cover 332 is fully open the outer surfaces of segments 332-1, 332-2 are disposed against each other, trapping dirt that has collected on the outer surfaces of the covers 331, 332 between the segments 331-1, 331-2 and 332-1, 332-2. The covers 331, 332 may be biased in closed position by a spring 338-1, 338-2 and/or by other compliant material and/or by gravity. FIGS. 3B and 3C show springs 338-1, 338-2 that are compressed as the covers 331, 332 move between the closed and open positions.

As shown in FIG. 3A, in some embodiments, cover actuators 341-1, 341-2 disposed on the mating connector 300b engage with the cover opening features 337-1, 337-2 of connector 300a causing the cover opening features 337-1, 337-2 to move back away from the opening 313 along the x axis which in turn causes the covers 331, 332 to open. In some implementations, the actuators 341-1, 341-2 also provide pin and slot alignment features for rough alignment of the connector 300a and the mating connector 300b. In some embodiments the cover opening features 337-1, 337-2 protrude from slots 335 in the housing 310. In some embodiments, the attachment point 339-1, 339-2 may run in a track, e.g., a track disposed in the sidewall of the housing, when the covers 331, 332 move between the closed and open positions.

Figure 4A:
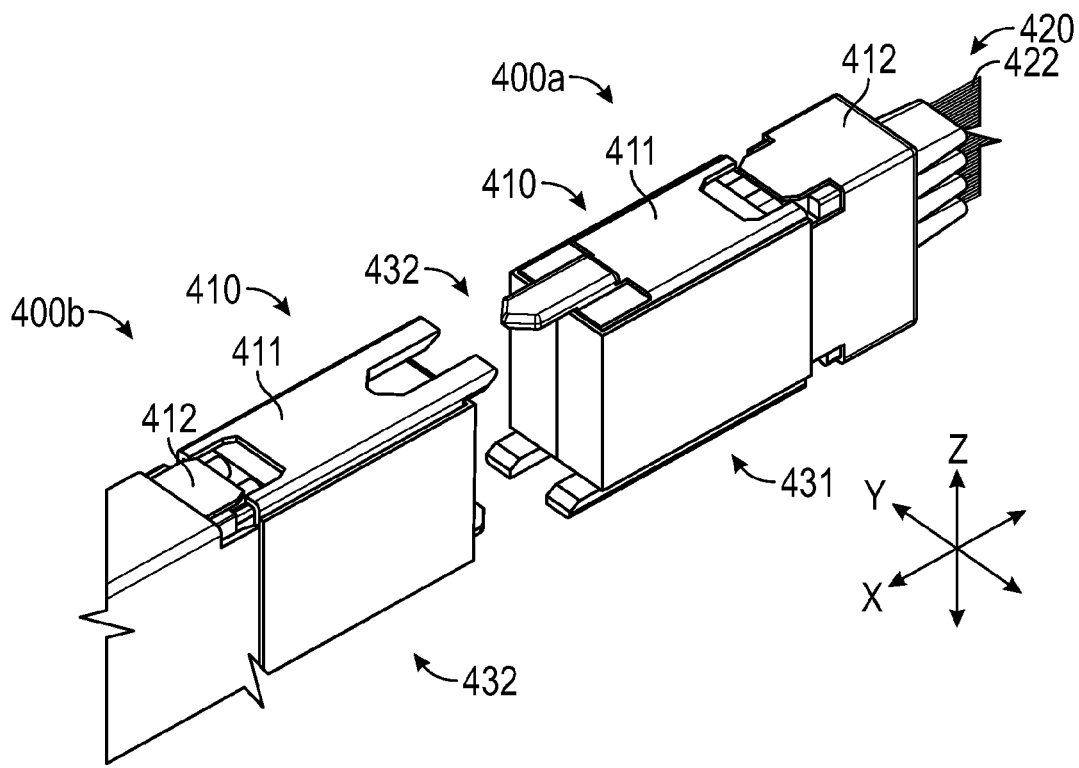
FIGS. 4A through 4C illustrate a "wing type" dust ingress mitigating cover configuration in accordance with some embodiments.
Figure 4B:
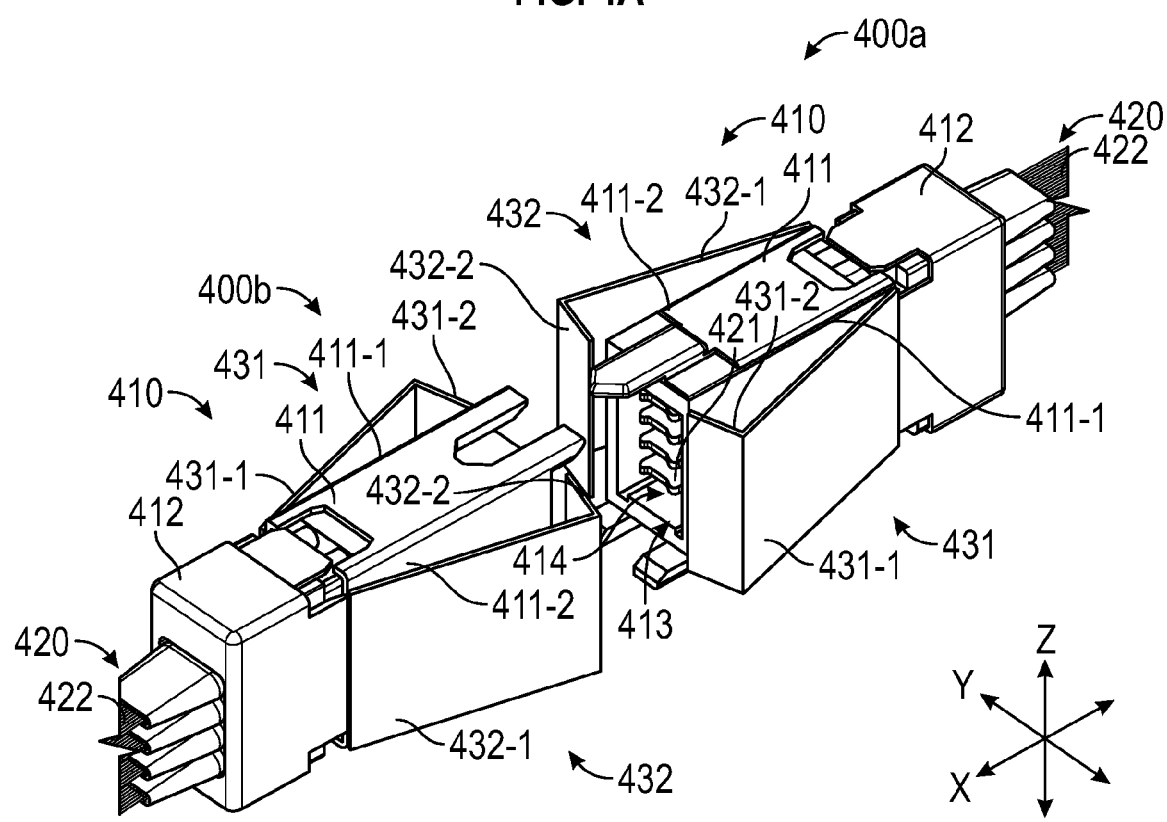
Figure 4C:
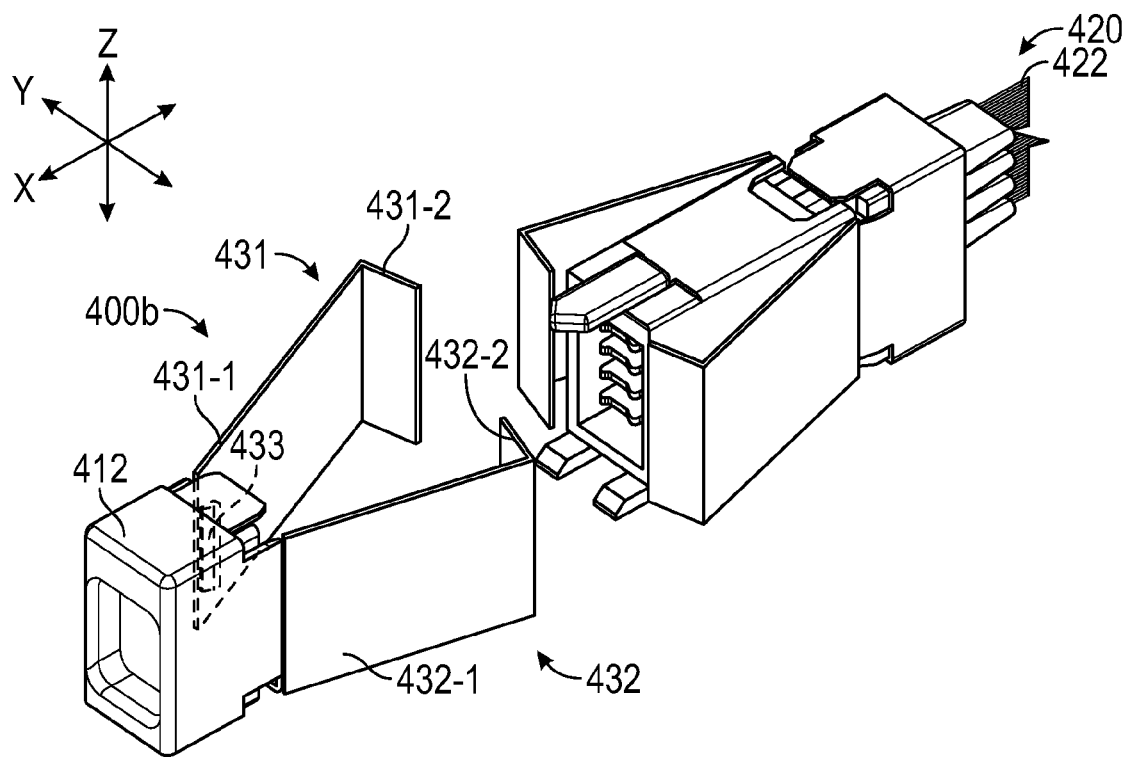

FIGS. 4A through 4C illustrate yet another dust ingress mitigating cover configuration in accordance with some embodiments. Each connector 400a and substantially similar mating connector 400b include a housing 410 having optical cables 420 disposed within an interior volume 414 of the housing 410. The optical cables 420 include one or more ferrules 421, each ferrule 421 having one or more waveguides 422 attached thereto. The waveguides 422 extend from the rear of the housing 410 as illustrated in FIG. 4B. FIGS. 4A through 4C provide perspective views of a connector 400a and an identical mating connector 400b. Each connector 400a, 400b includes two covers 431, 432. FIG. 4A shows the connectors 400a, 400b when the covers 431, 432 are in the closed position. FIG. 4B shows the connectors 400a, 400b when the covers 431, 432 are in the open position. FIG. 4C provides a semi-transparent view of the connectors 400a, 400b which shows the cover opening feature.

The dust mitigating covers 431, 432 are referred to herein as "wing type" dust mitigating covers because the way that the covers 431, 432 resemble a wing, e.g., a gull wing. In some embodiments, only one wing type cover extends across the opening 413 in the housing 410. In the embodiments illustrated by FIGS. 4A through 4C, two wing-type covers 431, 432 extend part way across the opening 413 meeting and/or in some implementations overlapping at about the midpoint of the opening 413. In some scenarios the covers may meet at a point that is not the midpoint, e.g., the covers may be asymmetrical. A gasket or other sealing surface may be arranged where the covers 431, 432 meet and/or overlap.

As shown in FIG. 4B, each cover 431, 432 comprises two sections 431-1, 431-2, 432-1, 432-2. The first section 431-1 of cover 431 extends along a first side 411-1 of the forward housing 411. The second section 431-2 of cover 431 is disposed at an angle to the first section 431-1. The second section 431-2 extends across the opening 413 when the cover 431 is in the closed position. The first section 432-1 of cover 432 extends along a second side 411-2 of the forward housing 411. The second section 432-2 of cover 432 is disposed at an angle to the first section 432-1. The second section 432-2 extends across the opening 413 when the cover 432 is in the closed position.

Each connector 400a, 400b includes a cover opening mechanism 433 (shown in FIG. 4C) for each cover 431, 432. The cover opening mechanism 433 is configured to move the cover 431, 432 from the closed position, in which the second sections 431-2, 432-2 of the first and second covers 431, 432 extend across the opening 413, to an open position in which the cover 431 rotates away from the first side 411-1 and the second gull wing cover 432 rotates away from the second side 411-2 to expose the opening 413. In some embodiments, the cover opening mechanism 433 includes a ramp disposed on an inner surface of the first section 431-1, 432-1 of each cover 431, 432. As illustrated in FIGS. 4A through 4C, in some embodiments, the housing 410 includes a forward housing 411 including the first side 411-1, the second side 411-2. The opening 413 in the housing 411 allows access to the optical ferrules. The housing 410 also includes a rear housing 412. Relative movement of the rear housing 412 and the forward housing 411 causes the rear housing 412 to slide on the ramps 422 causing and the covers 431, 432 to rotate in opposite directions around a pivoting axis. The rotation of the covers causes the covers 431, 432 to move from the closed position to the open position. In some embodiments, each of the covers 431, 432 is biased toward the closed position, e.g., by a torsion spring, or by gravity. When the cover is biased toward the closed position by gravity, an edge of the cover may be weighted. Although two covers are shown in FIGS. 4A through 4C, it will be appreciated that in some embodiments, only one cover may be used, the second section of the single cover extending across the opening.

Figure 5A:
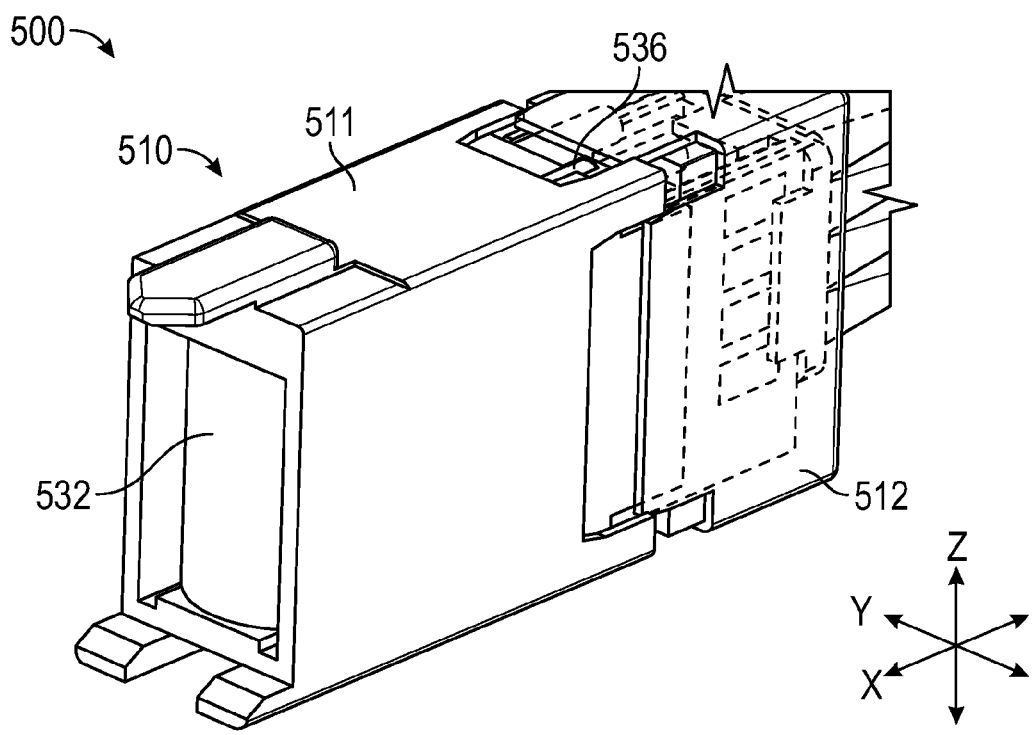
FIGS. 5A through 5D illustrate a "revolving type" dust ingress mitigating cover configuration in accordance with some embodiments.
Figure 5B:
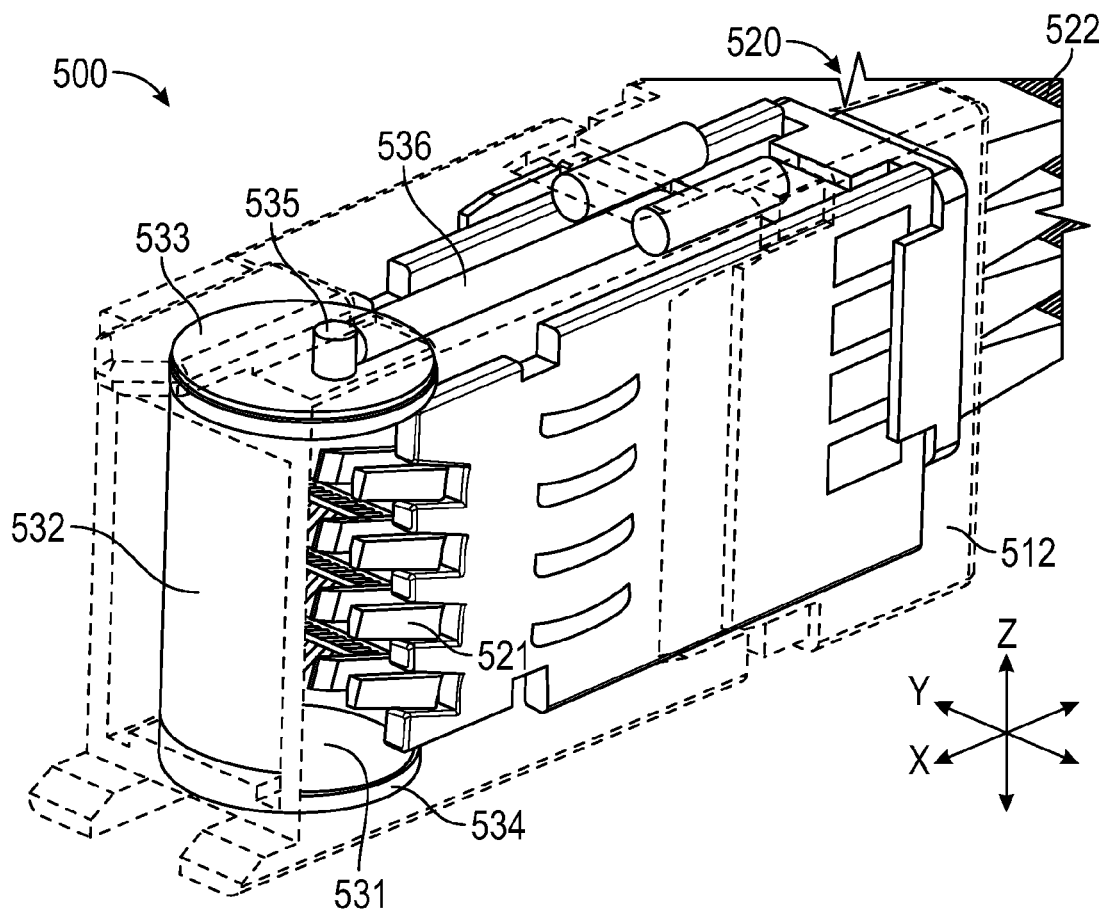
Figure 5C:
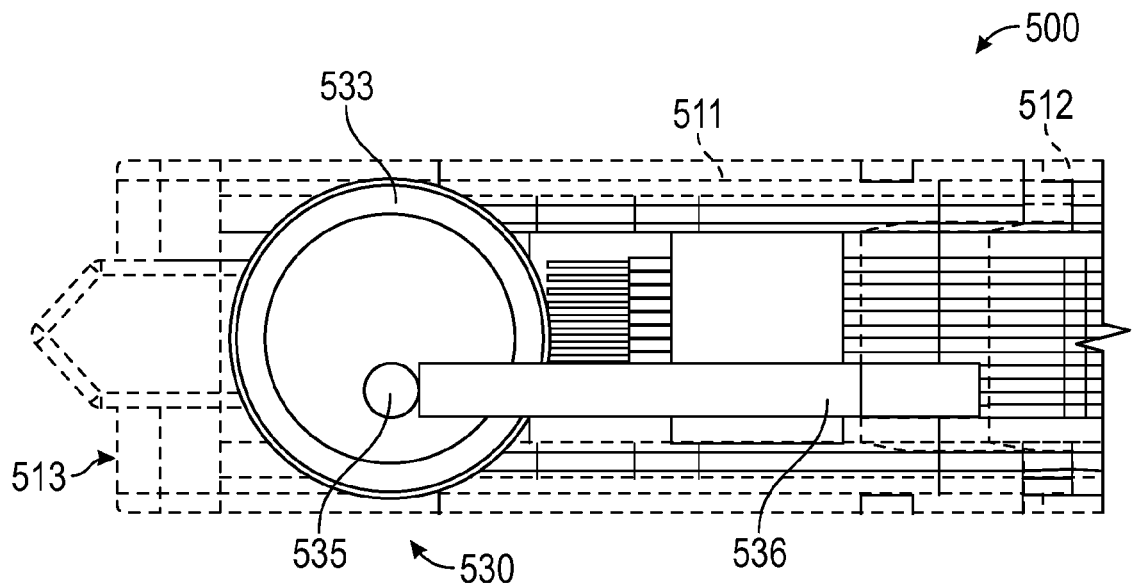
Figure 5D:
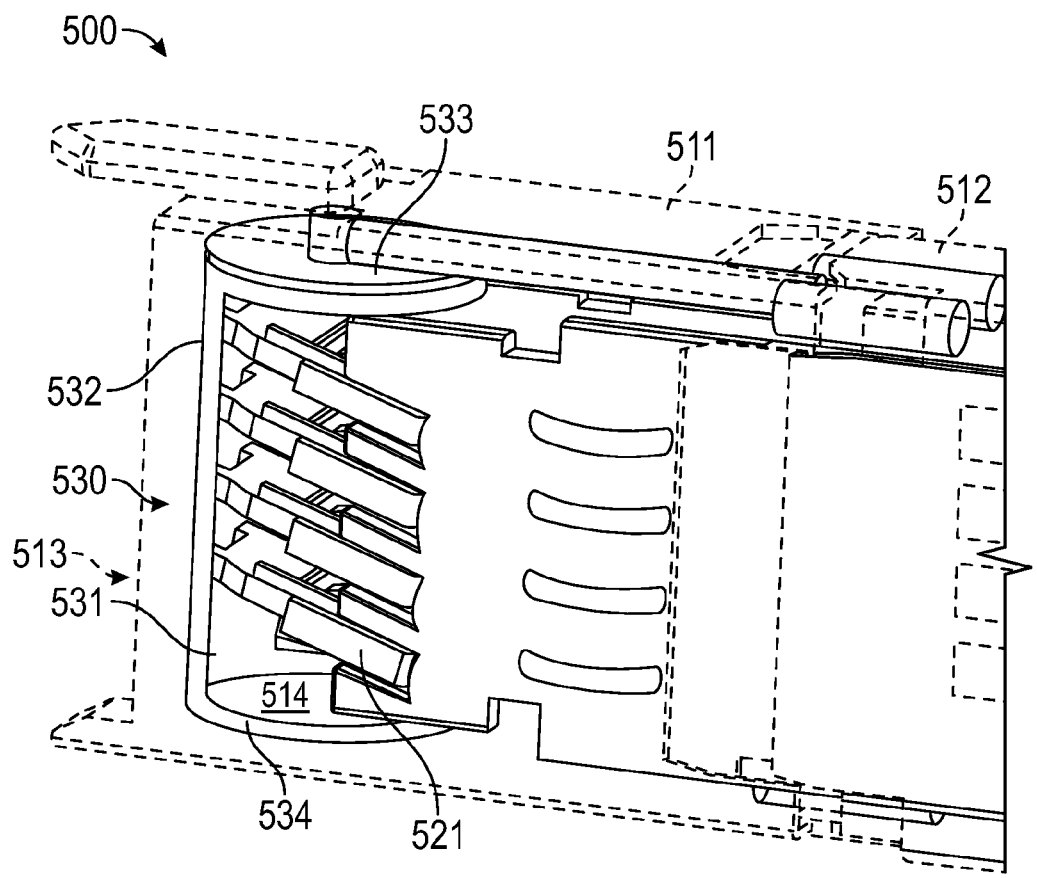

FIGS. 5A through 5C illustrate yet another dust ingress mitigating cover configuration in accordance with some embodiments. A connector 500 includes a housing 510 having optical cables 520 disposed within an interior volume of the housing 510. The optical cables 520 include one or more ferrules 521, each ferrule 521 having one or more waveguides 522 attached thereto. FIG. 5A provides perspective view of a connector 500; FIG. 5B provides the same perspective view as FIG. 5B except that the connector 500 shown in FIG. 5B is partially transparent so that the cover and cover opening mechanism is more easily observed; FIG. 5C is a partially transparent top view of the connector 500; and FIG. 5D is a partially transparent side view of the connector 500.

The dust mitigating 532 cover shown in FIGS. 5A through 5D is provided by a revolving partial cylinder 530 having an open section 531 and a solid section 532. The cylinder 530 is arranged to revolve such that the solid section 532 forms a cover when the solid section 532 extends across the opening 513 of the housing 513. The cylinder 530 can be rotated such that the open section 531 is aligned with the opening 513 in the housing 510 allowing access to the optical ferrules 521 disposed within the interior volume 514 of the housing 510. The connector 500 includes a cover opening mechanism 535, 536 configured to revolve the cylinder 530 from the closed position in which the solid section 532 extends across the opening 513 to an open position in which the open section 531 is aligned with the opening 513 and the opening 513 is exposed.

In some embodiments, the opening mechanism comprises an off center pin 535 on a top 533 or bottom 534 of the cylinder 530. The opening mechanism further includes a rod 536 configured to engage with the off center pin 535. Engagement of the rod 536 and the off-center pin 535 causes the cylinder 530 to revolve from the closed position to the open position. In some embodiments, the housing 510 of the connector 500 includes a forward housing 511 and a rear housing 512. Movement of the rear housing 512 relative to the forward housing 511 pushes the rod 536 toward the off center pin 535 causing the rod 536 to engage with the off center pin 535, rotating the cylinder 530. According to some embodiments, a spring biases the cylinder 530 in the open position. In some implementations, the connector 500 is arranged so that gravity biases the cylinder 530 in the closed position.

Embodiments illustrated in FIGS. 1 through 5 include hermaphroditic connectors that have dust mitigating covers on both mating connectors of a connector system. In some embodiments, the connectors of a connector system are gendered and include a male and a female connector. In gendered connector systems (or sometimes in hermaphroditic connector systems) is can be useful to have only one connector that includes a cover. For example, the connector with the cover can be a backplane connector and its mating connector may or may not have a cover. FIGS. 6A through 10 are cross sectional diagrams illustrating various gendered connector systems that have dust ingress mitigating covers on the male connector. The covers are opened by a lever (or other cover opening feature) operated by an actuator on the female connector. In the illustrated embodiments, the actuator is an edge of the female connector housing, although different types of actuators could be used.

Figure 6A:
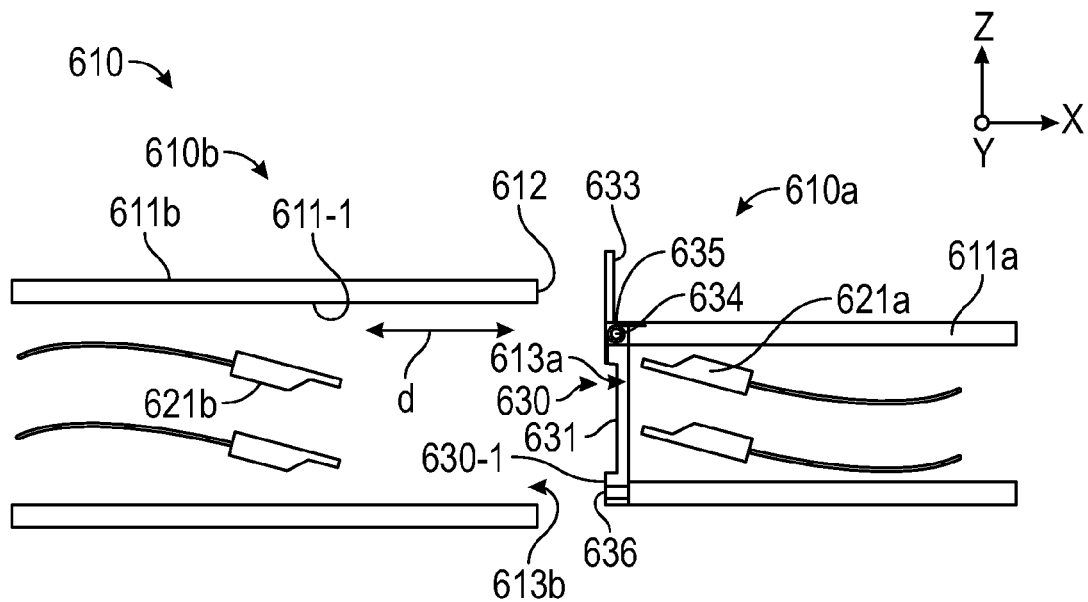
FIGS. 6A through 10 depict various embodiments of gendered optical connectors and connector systems that include dust ingress mitigating covers.
Figure 6B:
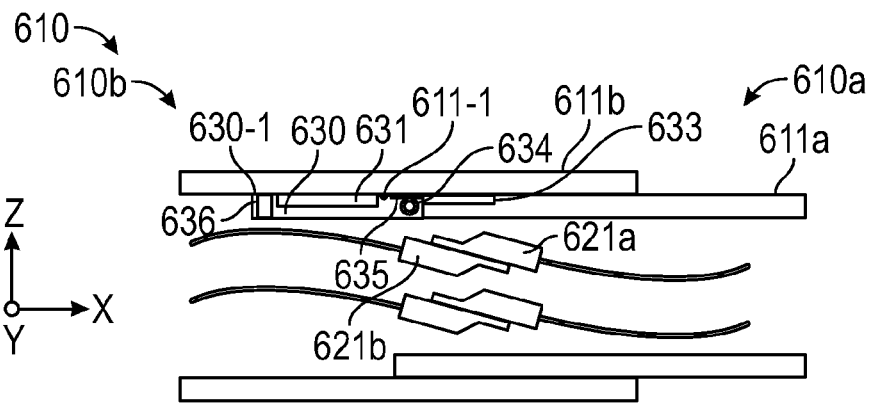

FIGS. 6A and 6B show connector system 610 comprising male 610a and female 610b connectors. Each connector 610a, 610b includes an opening 613a, 613b in the housing 611a, 611b through the optical ferrules 621a, 621b are accessible. FIG. 6A shows the connectors 610a, 610b before mating. FIG. 6B shows the connectors 610a, 610b after mating. A single dust mitigating cover 630 extends across the male connector housing 611a outside the opening 613a. The cover 630 is coupled to a lever arm 633 that extends outside the housing 611a. The lever arm 633 and the cover 630 are configured to rotate around a pivoting axis 634, e.g., provided by a pin or other pivot feature, when the lever 633 is operated. As the male connector housing 611a is inserted into the female housing 611b, the edge 612 of the female housing 611b pushes against the lever 633 to rotate the lever 633 and the cover 630 around a pivoting axis 634. As the cover 630 rotates around the pivoting axis 634, the cover 630 moves from the closed position (see FIG. 6A) to the open position (see FIG. 6B). The length of the cover 630 should typically be less than the distance, d, between the edge 612 of the female housing 611b and the tip of the ferrules 621b to give the cover 630 enough room to open into the female housing 611b without interfering with the ferrules 621b.

In the illustrated embodiment, when the cover 630 is in the closed position it rests outside or just inside the housing 611a of the male connector 610a near the opening 613. Alternatively, in some embodiments, the cover may be recessed within the housing as discussed in more detail below. When the cover 630 is in the open position, an outside surface 630-1 of the cover 630 rests proximate to or against the inside surface 611-1 of the female housing 611b. In some embodiments, the cover 630 may include one or more dust collection features, such as dust grooves, surface treatment, and/or a dust well 631, that trap the dust between the outer surface 630-1 of the cover 630 and the inner surface 611-1 of the housing 611b. In some embodiments, the dust well may comprise one or more grooves. The dust well may cover about 50, 60, 70, or even 80 percent of the external surface area of the cover. The outer surface 630-1 and inner surface 611-1 are proximate to and face one another at sealing areas, the surfaces at these sealing areas may make contact with each other. In some implementations a flexible, compressible, or other type of sealing material may be present between the outer 630-1 and inner 611-1 surfaces forming a seal for the dust well 631.

The cover 630 may be biased toward the closed position by an optional spring 635, e.g., a torsion spring. In some embodiments, the cover 630 may alternatively or additionally be biased toward the closed position by gravity. In arrangements in which gravity biases the cover 630 in the closed position, the cover 630 may optionally include a weight 636, e.g., a metal block, which can be molded into the cover during fabrication of the connector 610a.

Figure 7:
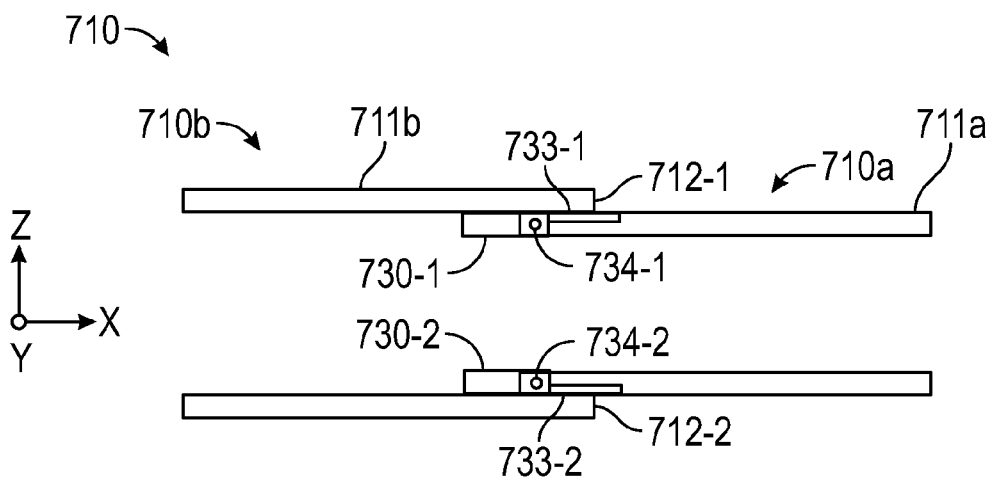

FIG. 7 illustrates a connector system 710 that is similar in some respects to the connector system 610 shown in FIGS. 6A and 6B. FIG. 7 illustrates the housings 711a, 711b of male 710a and female 710b connectors that are mated. Dual dust mitigating covers 730-1, 730-2 extend across the male connector housing 711a outside the housing opening. Each cover 730-1, 730-2 is coupled to a lever arm 733-1, 733-2 that extends outside the housing 711a. Each lever arm 733-1, 733-2 and its respective cover 730-1, 730-2 are configured to rotate around a pivoting axis 734-1, 734-2, e.g., provided by a pin or other pivot feature, when the lever 733-1, 733-2 is operated. As the male connector housing 711a is inserted into the female housing 711b, the leading edge 712-1, 712-2 of the female housing 711b pushes against the lever 733-1, 733-2 to rotate the lever 733-1, 733-2 and the cover 730-1, 730-2 around the pivoting axis 734-1, 734-2. As the cover 730-1, 730-2 rotates around the pivoting axis 734-1, 734-2, the cover 730-1, 730-2 moves from the closed position to the open position. The use of dual covers reduces the distance by which the ferrules need to be recessed within the female housing 711b.

Figure 8A:
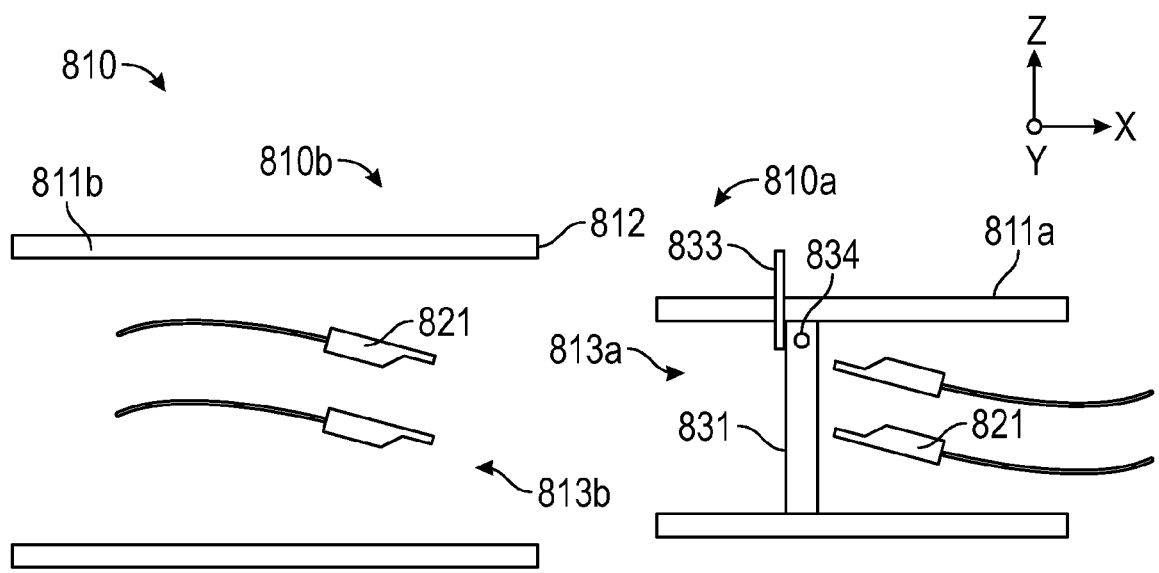
Figure 8B:
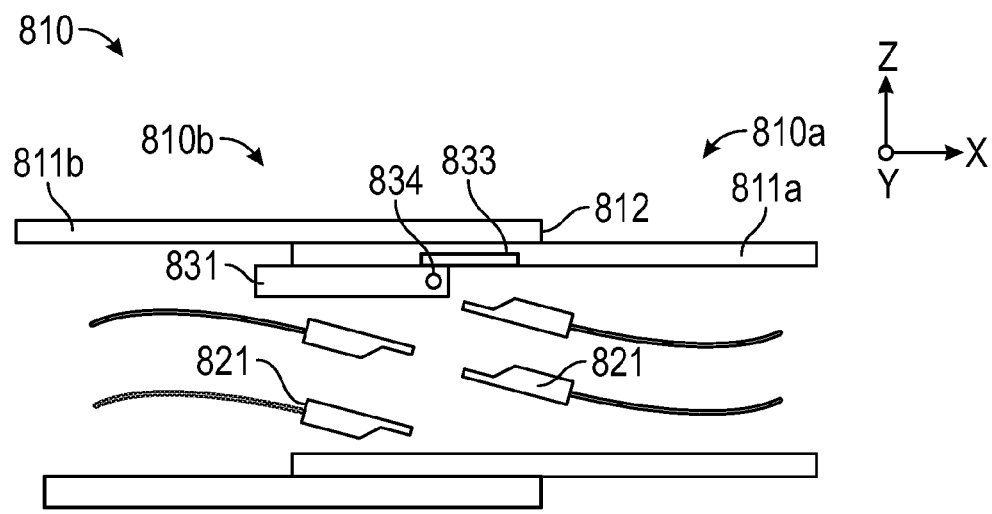

FIGS. 8A and 8B show connector system 810 comprising male 810a and female 810b connectors. Each connector 810a, 810b includes an opening 813a, 813b in the housing 811a, 811b through the optical ferrules 821 are accessible. FIG. 8A shows the connectors 810a, 810b before mating. FIG. 8B shows the connectors 810a, 810b after mating. A single dust mitigating cover 831 is recessed inside the male connector housing 811a by a distance that may be less than, equal to, or greater than the length of the cover 831. The cover 831 is coupled to a lever arm 833 that extends outside the housing 811a. The lever arm 833 and the cover 831 are configured to rotate around a pivoting axis 834, e.g., provided by a pin or other pivot feature, when the lever 833 is operated. As the male connector housing 811a is inserted into the female housing 811b, the leading edge 812 of the female housing 811b pushes against the lever 833 to rotate the lever 833 the cover 830 around a pivoting axis 834. As the cover 830 rotates around the pivoting axis 834, the cover 830 moves from the closed position (see FIG. 8A) to the open position (see FIG. 8B). The cover 830 opens within the male housing 811a such that the outer surface of the cover is proximate to or against the inner surface of the male connector housing 811a. Recessing the cover into the male housing 811a means that the ferrules 821 in the female connector 810b can protrude from the female housing 811a or be recessed by a smaller distance than the full length of the cover as in the embodiments illustrated in FIGS. 6 and 7, for example.

The cover may include a dust well as previously discussed. In some embodiments, the cover may be biased toward the closed position by an optional spring, e.g., a torsion spring, or by gravity. Gravity biased covers may include a weighted edge as previously discussed.

Figure 9:
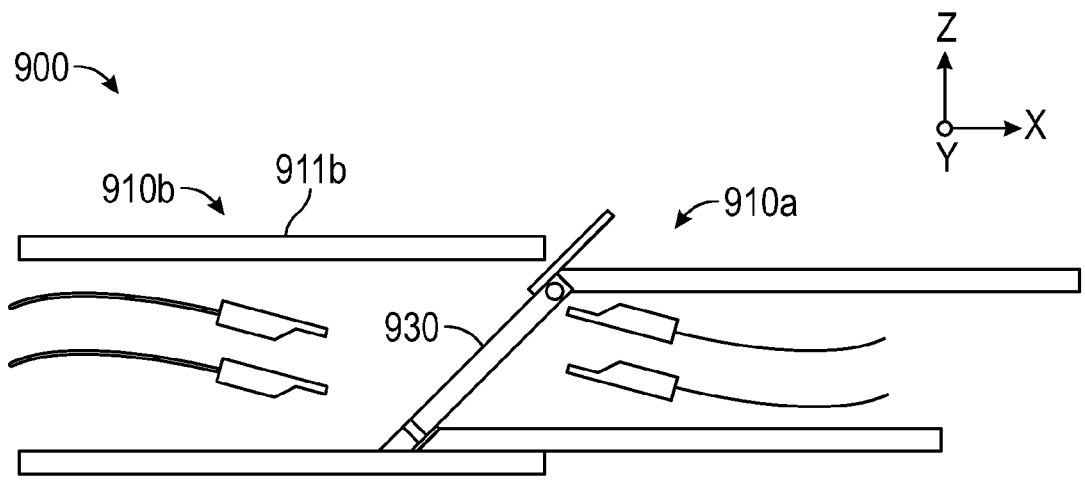
Figure 10:
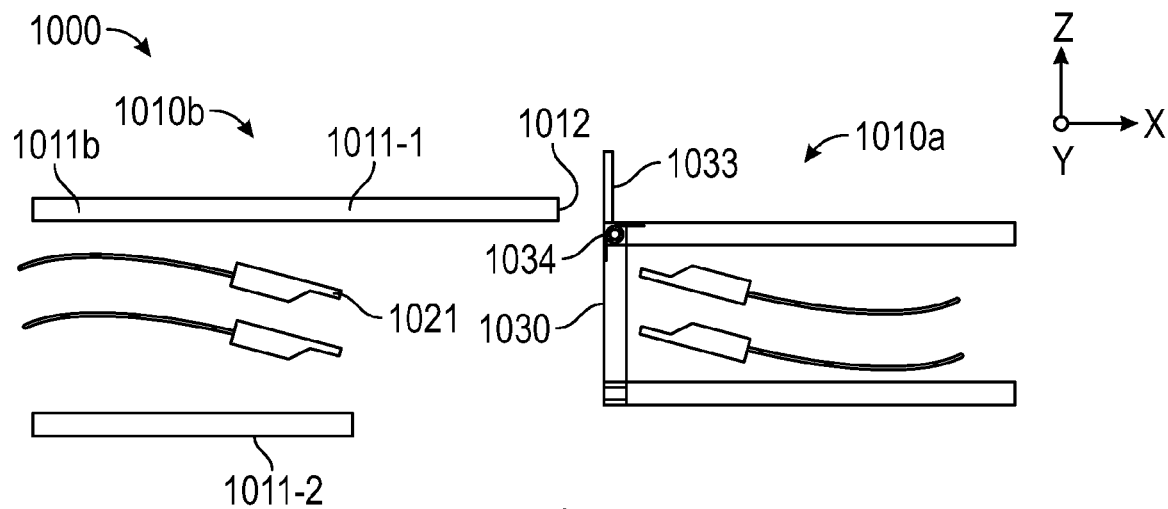

In some embodiments, one or both of the female and male housings may be angled as shown in the cross sectional diagrams of FIGS. 9 and 10. FIG. 9 shows a connector system 900 that includes a male connector 910a and a female connector 910b wherein the male connector 910a has an angled housing 911a. In the closed position, the cover 930 is disposed at an angle to the mating axis (x axis in FIG. 9).

FIG. 10 shows a connector system 1000 that includes a male connector 1010a and a female connector 1000b having an angled housing 1011b. In this embodiment, one side 1011-1 of the housing protrudes farther along the mating axis than the other side 1011-2 of the housing 1011b. The protruding edge 1012 engages with the lever 1033 to open the cover 1030 by rotating the cover 1030 around the pivoting axis provided by pin 1034. Depending on the length of the protrusion of the edge 1012, the ferrules 1021 in the female housing 1011b may not need to be recessed inside the housing 1011b to allow the cover 1030 to open inside the housing 1011b.

Figure 11:
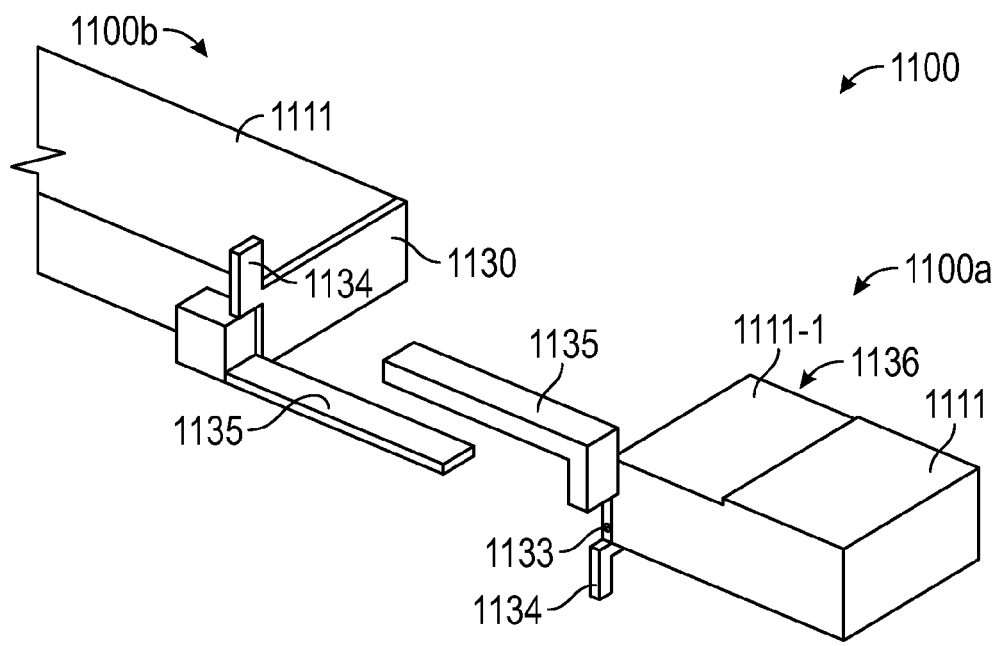
FIG. 11 is a perspective view of a hermaphroditic connector system, each connector having a dust ingress mitigating cover that is opened by an actuator on the mating connector in accordance with some embodiments.

FIG. 11 illustrates a hermaphroditic connector system 1100 comprising two identical hermaphroditic connectors 1100a, 1100b having dust ingress mitigating covers 1130. The cover 1130 is shown in the closed position in FIG. 11. Each cover 1130 is coupled to a lever 1134. The lever 1134 can be operated to cause the cover 1130 to rotate around a pivoting axis provided by pin 1133. An actuator 1135 extends from the side of the connector 1100a, 1100b and the mating connector and is configured to operate the lever 1133. During mating of the connectors 1100a, 1100b, the actuator 1135 of each connector 1100a, 1100b engages with the lever 1133 of the mating connector 1100b, 1100a.

Engagement of the actuator 1135 with the lever 1133 causes the lever 1133 and the cover 1130 to rotate around pin 1034, moving the cover 1130 from the closed position to the open position. The housing 1111 of each connector 1100a, 1100b includes a recess 1136 configured to receive the cover 1130 of the mating connector. After the connectors 1100a, 1100b are mated, the inner surface of the cover 1130 is disposed so that it faces and/or comes in contact with the outer surface 1111-1 of the housing 1111 in the recess 1036.

One or both of the covers may include a dust well as previously discussed. In some embodiments, the cover may be biased toward the closed position by an optional spring, e.g., a torsion spring, or by gravity. Gravity biased covers may include a weighted edge as previously discussed. In some embodiments, the lever 1134 and cover 1130 may comprise a unitary molded piece.

Figure 12A:
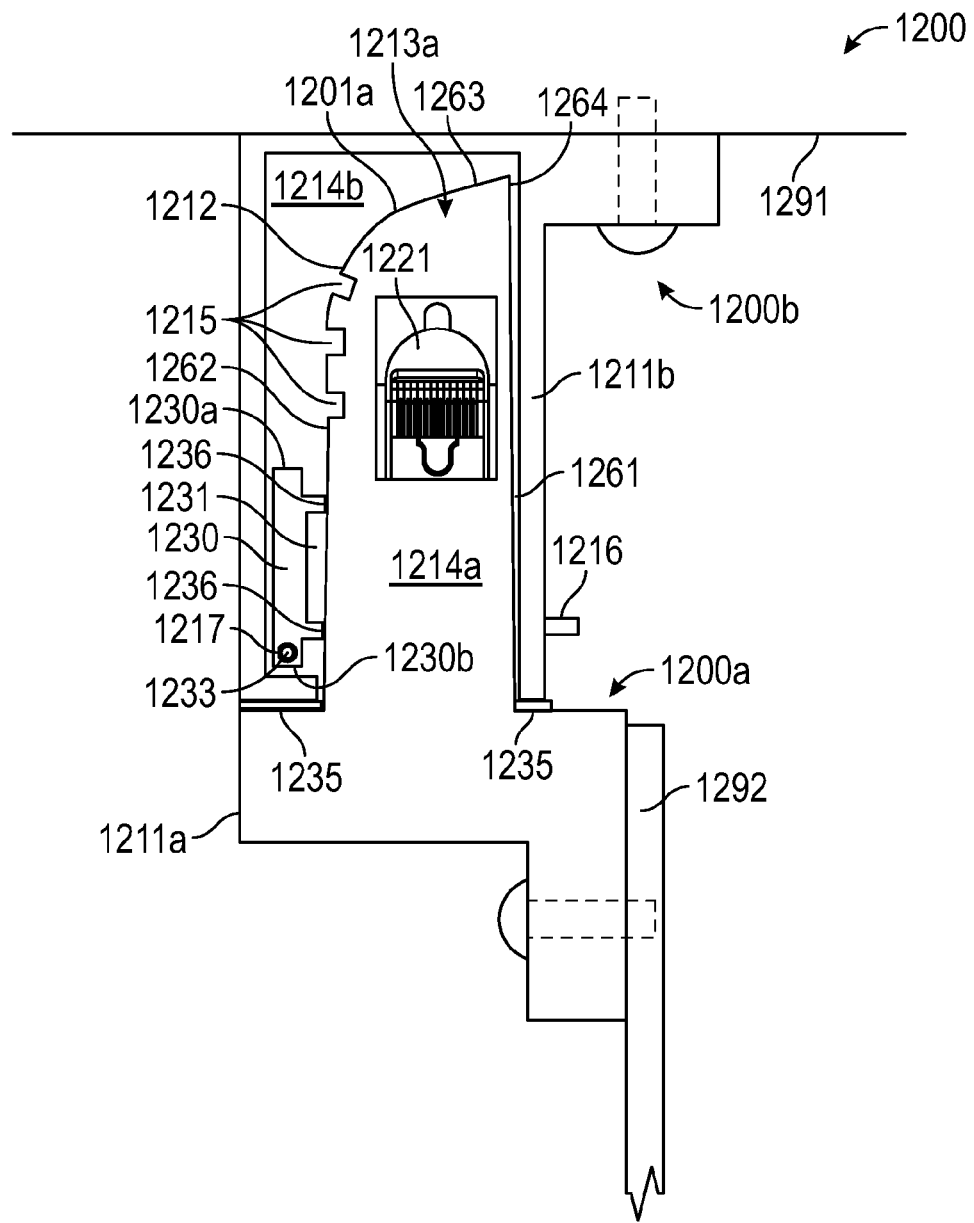
FIGS. 12A through 12C are various views of a gendered optical connector system that includes a curved surface for opening the dust ingress mitigating cover in accordance with some embodiments.
Figure 12B:
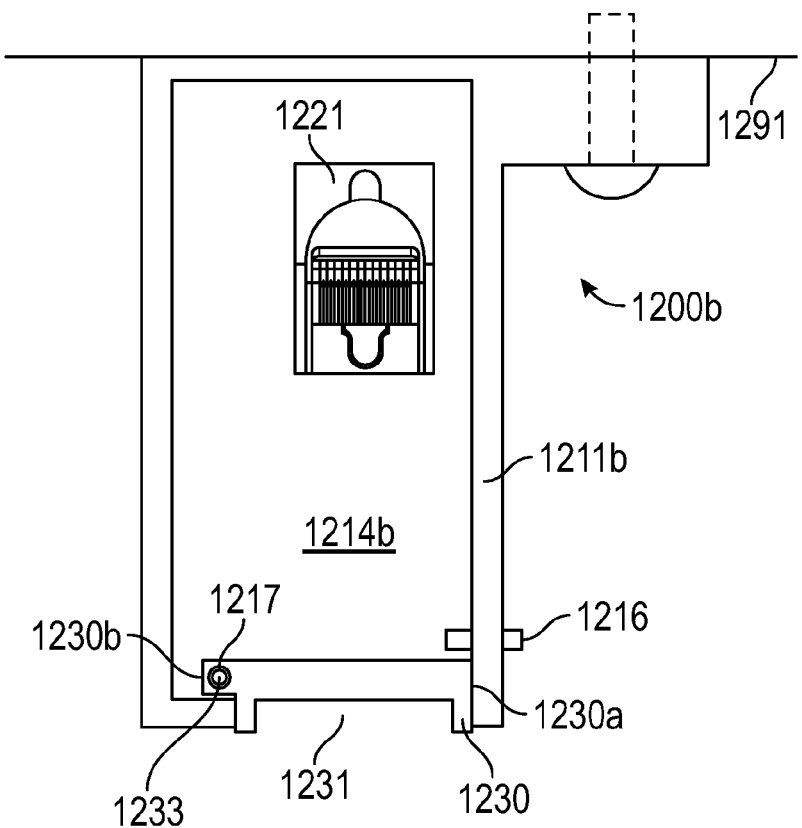
Figure 12C:
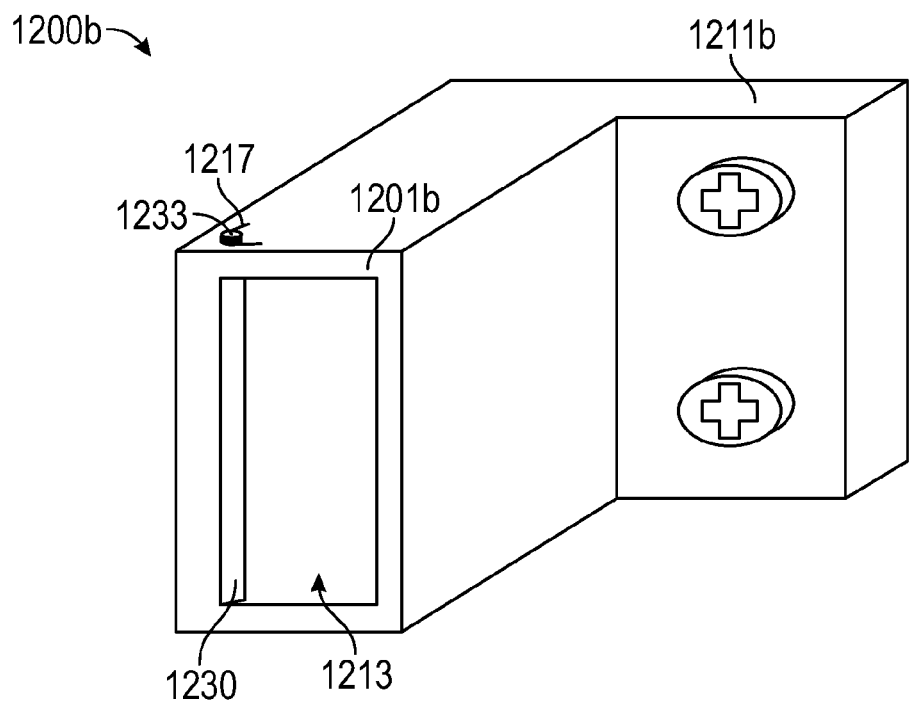

FIGS. 12A through 12C illustrate components of a gendered connector system 1200 comprising male 1200a and female 1200b connectors in accordance with some embodiments. As indicated in the illustrations, the female connector 1200b may be disposed on a backplane 1291 and the male connector 1200a may be attached to a circuit board 1292 configured to be coupled to the backplane 1291 through the connector system 1200. The connector system 1200 shown in FIGS. 12A through 12C relies on a curved surface that provides a cam that reduces variation in the force needed throughout the movement of the cover from the closed position to the open position. For example, the use of a curved surface on either the mating edge of the male connector housing or a curved outer surface of the cover itself can reduce the force needed to initiate the cover opening movement when compared to the force needed to initiate the cover opening when the cover and the leading mating edge of the male connector are both flat. In some embodiments, the use of a curved surface provides a force to open the cover that is substantially constant as the leading edge of the male connector is inserted in the female connector housing. In the embodiment shown in FIGS. 12A through 12C, the curved surface is at the mating edge of the male connector that engages with the cover. In an alternative embodiment, the edge of the male connector may be straight and the outer surface of the cover on the female connector may be curved.

FIG. 12A shows a top cutaway view of the connector system 1200 having a female 1200b connector with the cover 1230 in the open position and the male connector 1200a inserted into the female connector 1200b. FIG. 12B is a top cutaway view of the female connector 1200b with the cover 1230 in the closed position. FIG. 12C is view of the female connector 1200b with the cover 1230 partially visible and in the closed position.

FIG. 12A depicts a gendered optical connector system 1200 that includes male 1200a and female 1200b optical connectors. The male optical connector includes a housing 1211a having an opening 1213a at a curved mating end 1201a of the housing 1211a, with one or more optical ferrules 1221 accessible through the opening 1213a. Each of the optical ferrules 1221 is attached to one or more optical waveguides which are not shown in FIGS. 12A through 12C but which have been discussed previously herein. The curved housing of the male connector has a substantially straight first side 1261, a substantially straight second side 1262 opposite the first side, and an asymmetrically curved end 1263, wherein the first side 1261 is substantially parallel to the second side 1262 and the first side 1261 is longer than the second side 1262.

The connector system 1200 includes a female connector 1200b configured to mate with the male connector 1200a. The female connector 1200b includes a housing 1211b having an opening 1213b (see FIG. 12C) at the mating end 1201b. The opening 1213b is configured to receive the curved mating end 1201a of the housing 1211a of the male optical connector 1200a. One or more optical ferrules 1221 are disposed within the housing 1211a and are accessible through the opening 1213b of the female connector housing 1211b. The ferrules 1221 disposed in the interior volume 1214b of the female connector housing 1211b are configured to mate with the optical ferrules 1221 of the mating male optical connector 1200a. A cover 1230 extends across the housing opening 1213b of the female optical connector 1211b when the cover 1230 is in the closed position (See FIG. 12B). When closed, the cover 1230 reduces or prevents the ingress of dust and/or other contaminants into the interior 1214b of the female housing 1211b. In some embodiments, an external surface of the cover, when in the closed position protrudes slightly from or is substantially coplanar with the female connector housing at the mating end. The cover 1230 opens by pivoting around a pivoting axis 1233, moving from the closed position (shown in FIG. 12B) to the open position (shown in FIGS. 12A and 12C). The curved mating end 1201a of the housing 1211a of the male connector 1200a is configured to engage with the cover 1230 to cause rotation of the cover 1230 around the pivoting axis 1233 from the closed position to the open position.

As best seen in FIG. 12B, the cover 1230 includes a free edge 1230a opposite the edge 1230b constrained by the pivot 1233. During mating of the female and male connectors, a point 1264 at which the first side 1261 and the curved end 1263 join initially engages the cover 1230 proximate to a free edge 1230a of the cover which is opposite the pivoting axis. During mating, the curved edge at the mating end 1201a of the male connector 1200a applies a force to the cover 1230 causing the free edge 1230a of the cover 1230 to rotate into the interior 1214b of the housing 1211b of the female connector 1200b. The optical ferrules 1221 disposed in the female housing 1211b are set back by a distance sufficient to allow the cover 1230 to rotate into the housing 1211b of the female connector housing 1211b without colliding with the ferrules 1221. For example, the setback distance may be at least equal to a length of the cover 1230 as measured from the free edge 1230a to the edge 1230b constrained by the pivot 1233. In some embodiments, the curve at the mating end 1201a of the male connector 1200a is configured to provide an insertion force that is substantially constant as the cover 1230 transitions from the closed position to the open position.

As best seen in FIG. 12A, an optional seal 1235, e.g., a sealing surface or compliant sealing material such as an o-ring or gasket, may be disposed between the male and female connector housings 1211a, 1211b, providing a labyrinth seal that mitigates the ingress of dust. In some embodiments, the cover 1230 may include a dust well 1231 (or other features) on the exterior surface of the cover 1230 surrounded by a rim, the dust well configured to trap dust. In some embodiments, the rim may include grooves configured to channel dust into the dust well. In some embodiments there may be a sealing surface or compliant seal 1236, e.g., o-ring or gasket, disposed between the male connector housing 1211a and the cover 1230, that at least partially surrounds the dust well 1231. The dust well 1231 and seal 1236 are configured to keep dust that has collected in the dust well 1231 on the exterior surface of the cover 1230 from entering the interior 1214b of the female connector housing 1211b when the connectors 1200a,1200 b are mated.

In some embodiments, a portion 1212 of the male connector housing 1211a may include one or more dust grooves 1215 (or other features) configured to trap and/or channel dust into the features 1215 and/or into the dust well 1231. Additional information regarding the use of grooves to mitigate dust contamination of sensitive areas is disclosed in commonly owned U.S. Patent application identified by 62/240,000 entitled "Dust Mitigating Optical Connector," which is incorporated herein by reference.

As shown in FIG. 12A, the cover 1230 opens into the female connector housing 1211b. Some embodiments include a mechanism, such as a peg 1216 inserted through a hole in the housing 1211b. The peg 1216 in hole provides a stop feature configured to hold the cover 1230 closed to facilitate manual cleaning the exterior surface of the cover 1230 when the cover 1230 is closed.

In some embodiments, the cover 1230 may be biased toward the closed position by an optional spring, e.g., a torsion spring 1217, or by gravity. Gravity biased covers may include a weighted edge as previously discussed.

Figure 13A:
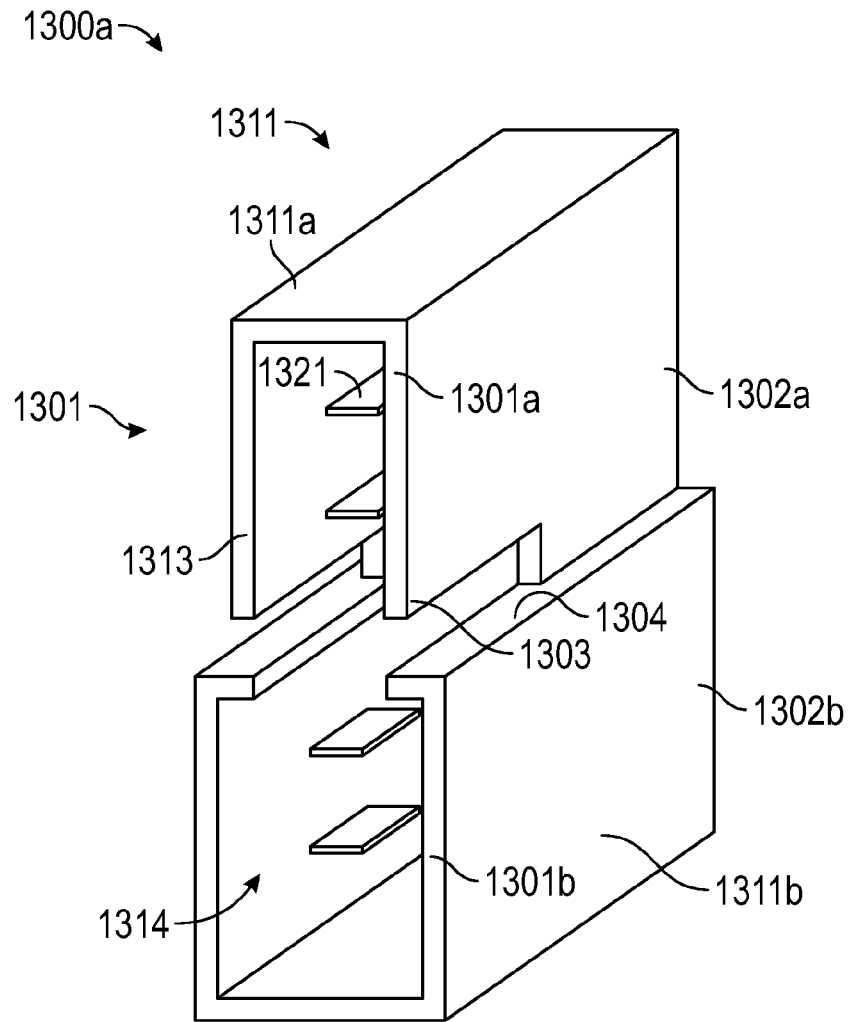
FIGS. 13A through 13E illustrate an interlocking hermaphroditic connector system in accordance with some embodiments.
Figure 13B:
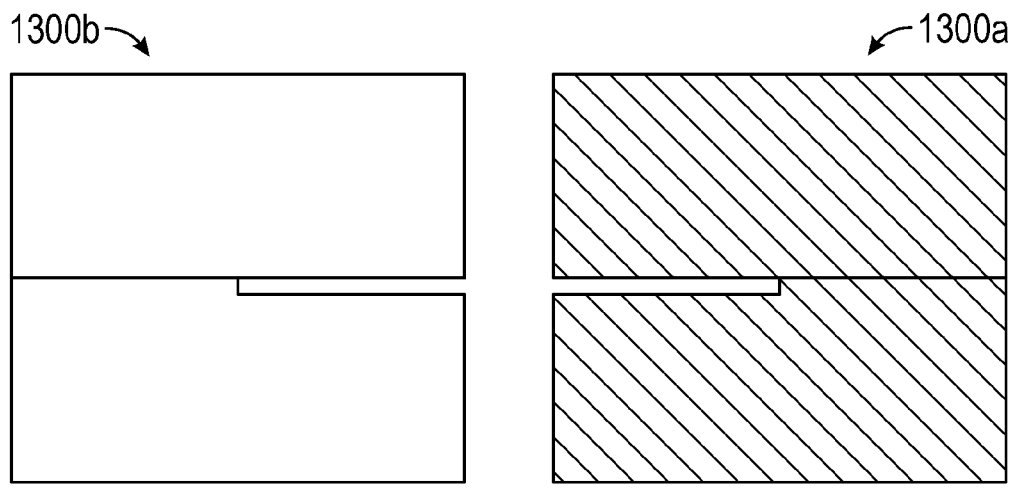
Figure 13C:
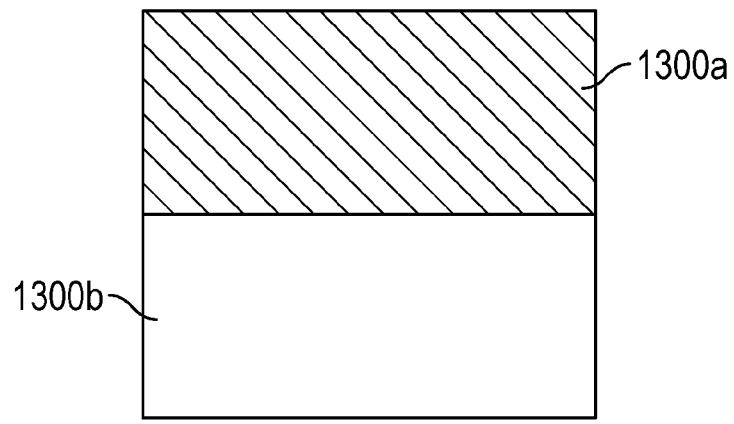
Figure 13D:
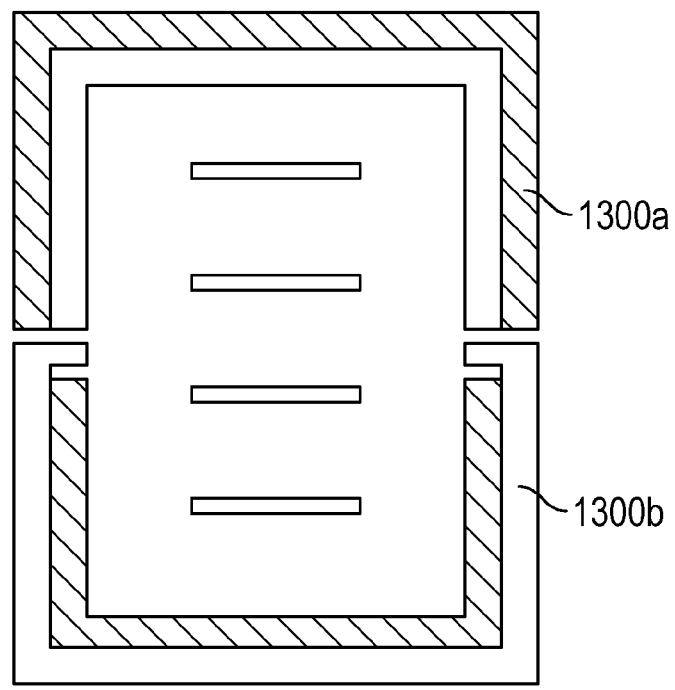
Figure 13E:
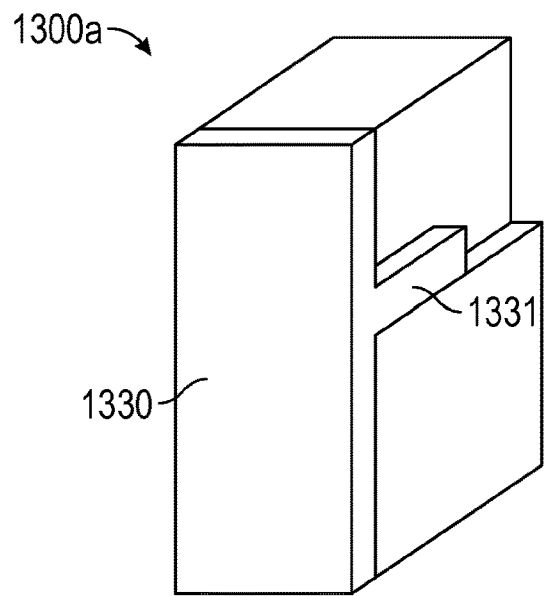

Some embodiments described above include a dust mitigating cover that is opened by an actuator or other feature of the mating connector. Some embodiments are directed to dust mitigating caps or plugs that fit over the mating end of one or both of the connectors in a mating connector system. FIGS. 13A through 13E illustrate a hermaphroditic connector 1300a that may be protected from the ingress of dust by a cap 1330 in some embodiments. FIG. 13A provides a perspective view of a hermaphroditic connector 1300a in accordance with some embodiments. FIG. 13B schematically illustrates a side view of a connector system comprising a connector 1300a and a mating connector 1300b of substantially similar configuration prior to mating. FIG. 13C shows the connector 1300a and mating connector 1300b after mating. FIG. 13D is a cross sectional end view of the mated hermaphroditic connectors 1300a, 1300b. FIG. 13D illustrates a hermaphroditic connector 1300a wherein the opening is protected by a cap 1330.

The hermaphroditic connector 1300a is an optical connector that includes a housing 1311 having an opening 1313 at a mating end 1301 for accessing optical cables including optical ferrules 1321 disposed within the interior volume 1314 of the housing 1311 and accessible through the opening 1313. The interior volume 1314 is formed by male 1311a and female 1311b housing portions of the housing 1311. The male portion 1311a of the housing 1311 extends between a male portion mating end 1301a and a male portion rear end 1302a. The housing 1311 has a female housing portion 1311b extending from a female portion mating end 1301b to a female portion rear end 1302b. A slot 1303 is disposed between the male and female portions 1311a, 1311b. The slot 1303 forms a gap separating the mating ends 1301a, 1301b of the male and female housing portions 1311a, 1311b. The slot 1303 extends partially from the male and female mating ends 1301a, 1301b to the male and female rear ends 1302a,1302b. The slot 1303 is configured to interlock the connector 1300a with a mating connector of substantially similar configuration when the connector 1300a and the mating connector are in the mated position.

In some embodiments, the slot 1303 extends about half way between the mating ends 1301a, 1301b and the rear ends 1302a,1302b. In some embodiments, the mating end 1301a of the male housing portion 1311a and the mating end 1301b of the female housing portion 1311b are substantially aligned at a mating end 1301 of the housing 1311.

In some implementations of the connector of FIGS. 13A through 13D, the optical ferrules 1321 are recessed within the interior volume 1314 of the housing 1311 for protection. For example, the ferrules 1321 may be recessed by at least one tenth, at least one fourth, or at least one half a length of the slot 1303. The female housing portion 1311b may include a lip 1304 that extends along the slot 1303. When the connector 1300 is mated with a mating connector having a substantially similar configuration, the lip 1304 is disposed within the slot of the mating connector. The housing 1311 shown in the illustrated embodiments can be simple in construction and may comprise a unitary molded piece.

FIGS. 13B and 13C show side views of the connector 1300a and a mating connector 1300b before (FIG. 13B) and after mating (FIG. 13C). FIG. 13D shows a cross sectional view of the mated connectors 1300a, 1300b.

In some embodiments, the opening 1313 of the connector 1300a may be protected by a removable cap 1330, e.g., made of a compliant material, to prevent dust ingress into the interior volume 1314. The cap 1330 may have an extension 1331 that fills the slot 1303.

Figures 14A, 14B:
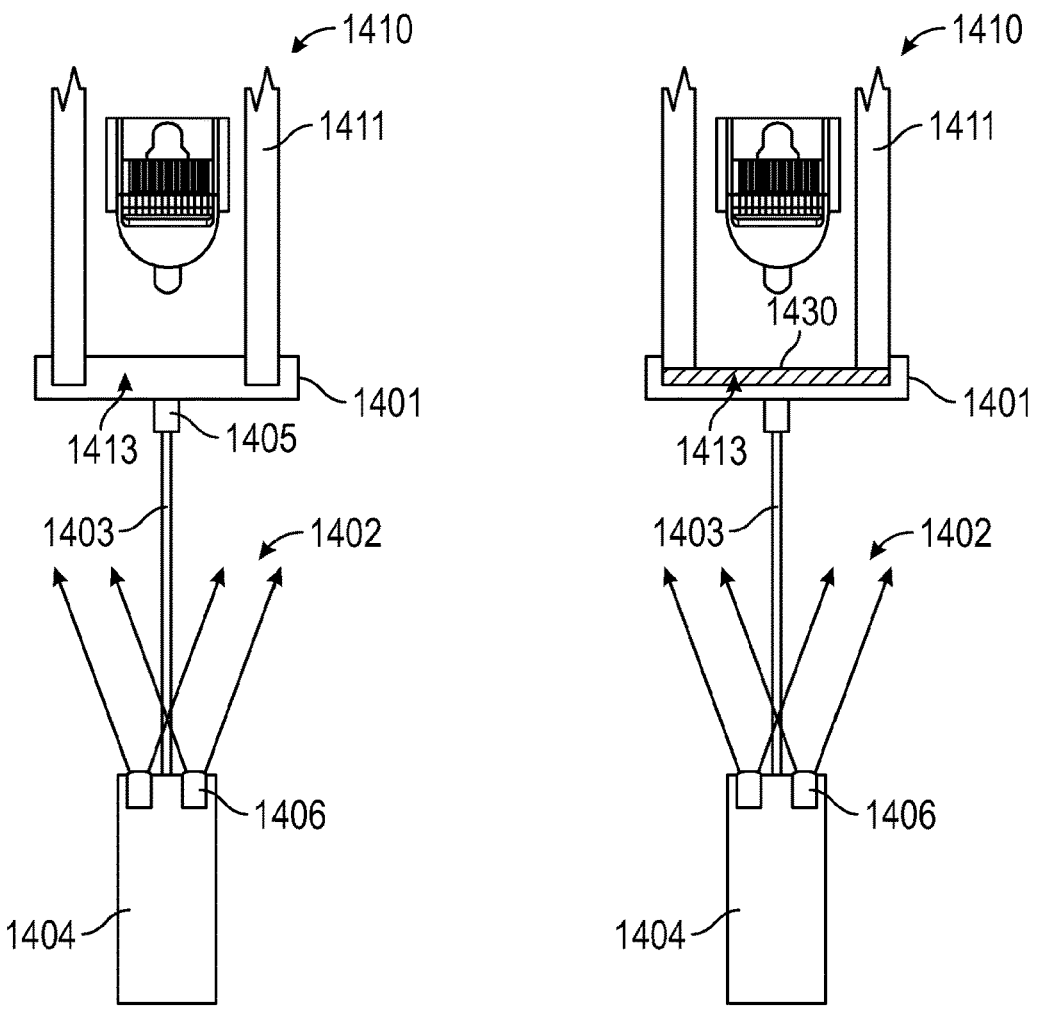
FIGS. 14A through 14E provide various views of a device that includes a dust ingress mitigating cover and a removal/installation tool for removing and/or installing the dust cover in accordance with some embodiments.

FIGS. 14A through 14E show dust caps and dust cap removal/installation tools that can be particularly useful for installing and removing dust caps from backplane mounted optical connectors. FIG. 14A illustrates a dust cap 1401 and a cap installation/removal tool 1402 in accordance with some embodiments. The dust cap 1401 is dimensioned to fit over, within, or both over and within an opening 1413 of a housing 1411 of an optical connector 1400. In some embodiments, illustrated by FIG. 14B, the dust cap 1401 may fit over a cover 1430 as described herein.

The cap installation/removal tool 1402 facilitates manipulating and positioning the dust cap 1402 on the connector 1400. The cap installation/removal tool 1402 comprises an arm 1403 that can be attached to the cap 1401 through release mechanism 1405 configured to release the cap 1401 from the handle 1403. The length of the arm 1403 allows for installing and removing the dust cap 1401 from the connector 1400 when the connector 1400 disposed on a backplane in an equipment rack, for example. The cap installation/removal tool 1402 may include a handle 1404 disposed at one end of the arm 1403. The handle 1404 may be made of a material that allows a user to securely grip the handle to manipulate the cap installation/removal tool 1402.

A release mechanism 1405 facilitates removal and installation of the dust cap 1401 from the optical connector 1400. The release mechanism 1405 may include first features on the dust cap 1405a and second features 1405b on the cap installation/removal tool 1402. The second features 1405b are located, for example, at an opposite end of the arm 1403 from the handle 1404. The release mechanism 1405 can be operated by the user to release the tool 1402 from the dust cap 1401 after the dust cap 1401 is installed on the optical connector 1400. The release mechanism 1405 can be used to connect the cap installation/removal tool 1402 to the dust cap 1401 so that the dust cap 1401 can be removed from the optical connector 1400. In various embodiments, the release mechanism 1405 may include a threaded release mechanism, a twist lock release mechanism, a magnetic release mechanism, a ball and socket release mechanism, a suction release mechanism, or other type of release mechanism.

Figure 14C:
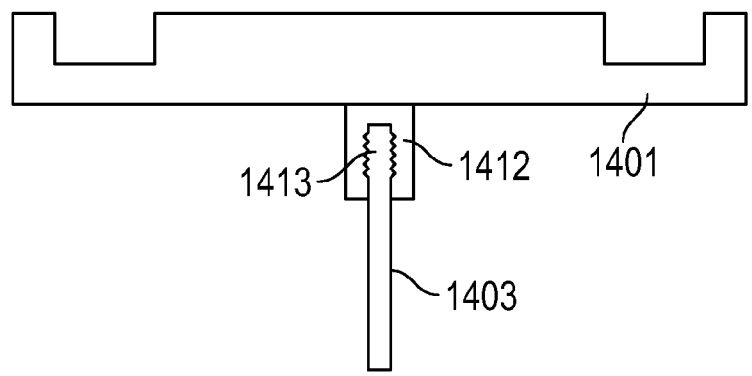
Figure 14D:
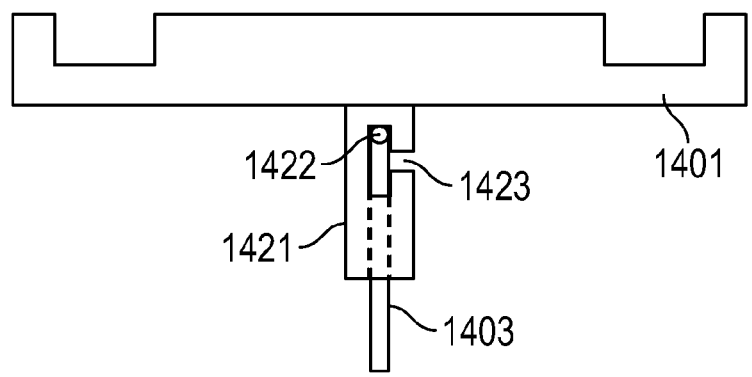
Figure 14E:
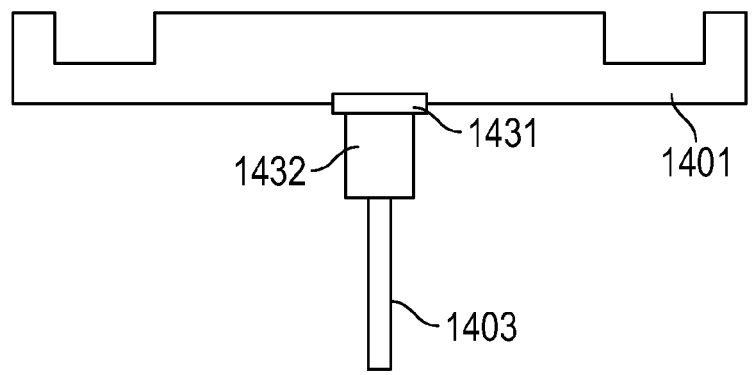

FIG. 14C illustrates a threaded release mechanism that includes an eternally threaded portion 1413 on the arm 1403 that can be screwed into an internally threaded nut or other internally threaded portion 1412 of the dust cap 1401, for example. FIG. 14D illustrates a release mechanism comprising a slotted sleeve 1421 on the dust cap and a protrusion 1422 on the arm 1403 that fits within the slotted sleeve 1421. The protrusion 1422 can be inserted and removed from the sleeve when it is positioned at the exit slot 1423. FIG. 14D illustrates a magnetic release mechanism wherein the dust cap 1401 includes a metal piece 1431 and the cap installation/removal tool 1402 includes a magnet 1432 at the end of the arm 1403.

As illustrated in FIGS. 14A and 14B, in some embodiments, the cap installation/removal tool 1402 may include a light source 1406 attached to the handle 1404 or elsewhere on the cap installation/removal tool 1402. The light source 1406 may comprise one or more light emitting diodes (LEDs), for example, arranged to shine light towards the connector 1400.

Items described in this disclosure include:

1. An optical connector comprising:
a housing configured to contain one or more optical ferrules disposed within the housing and accessible through an opening at a mating end of the housing;
a cover at the mating end, the cover configured to be rotated about a pivoting axis between a closed position an open position; and
at least one cover opening actuator disposed within the housing when the cover is in the closed position and extending at least partially from the opening in the housing when the cover is in the open position, the actuator, when extending at least partially from the opening, configured to engage with an internal face of the cover to cause the cover to rotate about the pivoting axis from the closed position to the open position.

2. The optical connector of item 1, further comprising at least one spring arranged to bias the cover toward the closed position.

3. The optical connector of item 1, wherein the cover comprises a first cover and a second cover.

4. The optical connector of item 3, wherein a rotational direction of the first cover when moving from the closed position to the open position is opposite from a rotational direction of the second cover when moving from the closed position to the open position.

5. The optical connector of item 1, wherein the housing includes at least one recess configured to accept a cover of a mating optical connector that is in the open position.

6. The optical connector of item 1, wherein:
the cover comprises a upper cover and a lower cover;
a rotational direction of the upper cover when moving from the closed position to the open position is opposite from a rotational direction of the lower cover when moving from the closed position to the open position; and
the housing comprises a first recess in an outer surface of a first side of the housing and a second recess in an outer surface of a second side of the housing opposite the first side, the first recess configured to accept an upper cover of a mating optical connector that is in the open position and the second recess configured to accept a lower cover of the mating optical connector that is in the open position.

7. The optical connector of item 6, wherein the upper and lower covers of the mating connector and first and second recesses of the connector are configured such that engagement of the upper and lower covers of the mating connector with first and second recesses of the connector, respectively, aligns the connector with the mating connector.

8. The optical connector of item 6, wherein:
the housing includes a first side and an opposing second side with a distance between the first and second sides along a first axis;
the upper cover is attached to an upper portion of the first side; and
the lower cover portion is attached to a lower portion of the second side, the upper cover portion offset from the lower portion along a second axis orthogonal to the first axis, wherein when the upper portion is in the closed position, the upper cover portion extends substantially from the first side of the housing to the second side of the housing and when the lower cover portion is in the closed position, the lower cover portion extends substantially from the second side of the housing to the first side of the housing.

9. The optical connector of item 1, wherein:
the housing includes a first side and an opposing second side with a distance between the first and second sides along a first axis;
the upper cover is attached to an upper portion of the first side; and
the lower cover is attached to a lower portion of the second side, wherein the upper portion is substantially aligned with the lower portion along a second axis orthogonal to the first axis, and wherein when the upper portion is in the closed position, the upper cover extends from the first side, the lower cover extends from the second side and the upper and lower covers extend to meet or overlap between the first and second sides.

10. The optical connector of item 1, wherein the housing comprises a forward housing and a rear housing, the forward housing including the mating end and the opening, wherein movement of the forward housing relative to the rear housing causes the at least one actuator to extend at least partially from the opening, to engage with the cover, and to cause the cover to rotate from the closed position to the open position.

11. The optical connector of item 1, wherein the connector is hermaphroditic and is configured to mate with a mating connector having a similar hermaphroditic configuration.

12. An optical connector comprising:
a housing configured to contain one or more optical ferrules disposed within the housing proximate to an opening at a mating end of the housing;
at least one track;
a cover disposed across the opening at the mating end when the cover is in a closed position, the cover configured to bend or hinge along the track as the cover moves from the closed position in which the cover covers the opening to an open position in which the opening is exposed; and a cover opening feature coupled to the cover and configured to be operated to cause the cover to move from the closed position to the open position.

13. The optical connector of item 12, wherein the cover opening feature is configured to engage with an actuator of a mating connector during mating of the connector with a mating connector, engagement of the cover opening feature and the actuator causing the cover to move from the closed position to the open position during the mating.

14. The optical connector of item 12, further comprising at least one spring arranged to bias the cover toward the closed position.

15. The optical connector of item 12, wherein gravity biases the cover toward the closed position.

16. The optical connector of item 15, wherein a free edge of the cover is weighted.

17. The optical connector of item 12, wherein the cover opening feature protrudes through a slot in the housing.

18. The optical connector of item 12, wherein the cover opening feature comprises a first and a second cover opening feature disposed at opposite edges of the cover or a single opening feature disposed at a central location of one edge of the cover.

19. The optical connector of item 12, wherein the track is disposed within the housing.

20. The optical connector of item 12, wherein the at least one track comprises a first track disposed at one side of the opening and a second track disposed at an opposite side of the opening.

21. The optical connector of item 12, wherein, in the closed position, the cover is disposed within the housing such that an outer surface of the cover faces an inner surface of the housing.

22. The optical connector of item 12, wherein:
the cover comprises a first cover and a second cover, the first cover comprises a flexible material or sections hinged together that allow the first cover to bend around a first track in a first direction as the first cover moves from the closed position in which the first cover covers a first portion of the opening to an open position in which the first cover exposes the first portion of the opening; and
the second cover comprises a flexible material or sections hinged together that allow the second cover to bend around a second track in a second direction as the second cover moves from the closed position in which the second cover covers a second portion of the opening to an open position in which the second cover exposes the second portion of the opening; and
the opening feature comprises a first opening feature coupled to the first cover and a second opening feature coupled to the second cover.

23. The optical connector of item 12, further comprising at least one actuator configured to engage the opening feature of a mating cover during mating of the connector with the mating connector, engagement of the actuator with the opening feature of the mating cover causing the mating cover to move from the closed position to the open position.

24. The optical connector of item 12, wherein the connector is hermaphroditic and is configured to mate with a mating connector having a similar hermaphroditic configuration.

25. The optical connector of item 12, wherein a first portion of the track extends along a first axis lying in a plane of the opening and a second portion of the track extends along a second axis at an angle to the first axis.

26. The optical connector of item 25, wherein the angle is about 90 degrees.

27. The optical connector of item 12, wherein the cover is a flexible material.

28. The optical connector of item 12, wherein the cover comprises first and second covers that overlap.

29. The optical connector of item 12, where the cover is disposed in a pocket within the housing when in the open position.

30. An optical connector comprising:
a housing configured to contain one or more optical ferrules disposed within the housing proximate to an opening at a mating end of the housing; and
a fan fold cover comprising at least two fan sections with a hinge between the two fan sections, one of the two fan sections attached to the housing at a pivoting axis.

31. The optical connector of item 30, further comprising at least one spring arranged to bias the cover toward the closed position.

32. The optical connector of item 30, further comprising:
a cover opening mechanism coupled to the cover, the cover opening mechanism comprising:
a cover opening feature; and
a cover opening linkage coupled to the cover and the cover opening feature, wherein movement of the cover opening feature and the cover opening linkage causes the cover to move from the closed position to the open position.

33. The optical connector of item 32, wherein the hinge moves towards the opening or further into the opening as the cover moves from the closed position to the open position.

34. The optical connector of item 32, wherein the cover opening feature protrudes through a slot in the housing.

35. The optical connector of item 30, wherein, in the closed position, the outer surfaces of the fan sections face each other.

36. The optical connector of item 30, further comprising at least one actuator configured to engage a cover opening mechanism of a mating cover during mating of the connector with the mating connector, engagement of the actuator with the cover opening mechanism of the mating cover causing the mating cover to move from the closed position to the open position.

37. The optical connector of item 30, wherein the connector is hermaphroditic and is configured to mate with a mating connector having a similar hermaphroditic configuration.

38. The optical connector of item 30, further comprising a spring configured to bias the cover in the closed position.

39. The optical connector of item 30, wherein the cover is arranged such that gravity biases the cover in the closed position.

40. The optical connector of item 39, further comprising a weight at a free edge of the fan fold cover that facilitates gravity biasing of the cover in the closed position.

41. An optical connector, comprising:
a housing configured to contain one or more optical ferrules disposed within the housing proximate to an opening at a mating end of the housing;
at least one cover at the mating end, the cover comprising a first section that extends along a first side of the housing and a second section disposed at an angle to the first section, the second section extending across the opening when the cover is in the closed position; and
a cover opening mechanism configured to move the cover from the closed position in which the second section extends across the opening to an open position in which the cover rotates away from the first side to expose the opening.

42. The optical connector of item 41, wherein the at least one cover comprises first and second covers:
the first cover including a first section that extends along a first side of the housing and a second section disposed at an angle to the first portion, the second section extending across a first region of the opening when the cover is in the closed position; and
the second cover including a first section that extends along a second side of the housing and a second section disposed at an angle to the first portion, the second section extending across a second region the opening when the cover is in the closed position.

43. The optical connector of item 42, wherein:
the cover opening mechanism includes first ramp disposed on a surface of the first section of the first gull wing cover and a second ramp disposed on a surface of the first section of the second gull wing cover;
the housing comprises:
a forward housing including the mating end, the first side, the second side, and the opening; and a rear housing, wherein movement of the rear housing towards the forward housing causes the rear housing to slide on the first and second ramps and the first and second covers to rotate in opposite directions from the closed position to the open position.

44. The optical connector of item 41, further comprising at least one spring configured to bias the cover in the closed position.

45. The optical connector of item 41, wherein gravity biases the cover in the closed position.

46. An optical connector comprising:
a housing configured to contain one or more optical ferrules disposed within the housing proximate to an opening at a mating end of the housing;
a revolving cylindrical cover at the mating end; and
a cover opening mechanism configured to revolve the cover from the closed position in which a solid portion of the revolving cover extends across the opening to an open position in which the opening is exposed.

47. The optical connector of item 46, wherein:
the opening mechanism comprises:
an off center pin on the revolving cover; and
a rod configured to engage with the off center pin, engagement of the rod and the off-center pin causing the revolving cover to revolve from the closed position to the open position.

48. The optical connector of item 47, wherein the housing comprises:
a forward housing including the mating end and the opening; and
a rear housing, wherein movement of the rear housing portion relative to the forward housing portion causes the rod to engage with the off center pin.

49. The optical connector of item 46, further comprising at least one spring configured to bias the cover in the closed position.

50. An optical connector, comprising:
a housing configured to contain one or more optical ferrules disposed within the housing and accessible through an opening at a mating end of the housing;
a cover at or near the mating end, the cover configured to be rotated about a pivoting axis between a closed position in which the opening is covered by the cover and an open position in which the opening is exposed; and
a cover opening mechanism including a lever extending outside the housing, wherein rotation of the lever causes the cover to rotate about the pivoting axis from a closed position in which the cover extends across the opening to an open position in which the opening is exposed.

51. The optical connector of item 50, wherein the lever and the cover are a unitary molded piece.

52. The optical connector of item 50, wherein, when the cover rotates from the closed position to the open position, a free end of the cover opposite the pivoting axis moves towards a rear end of the housing.

53. The optical connector of item 50, wherein, when the cover rotates from the closed position to the open position, a free end of the cover opposite the pivoting axis moves towards the mating end of the housing.

54. The optical connector of item 50, wherein, when the cover rotates from the closed position to the open position, a free end of the cover extends at least partially outside the housing when the cover is in the open position.

55. The optical connector of item 50, wherein the cover extends at least partially within the housing when the cover is in the open position.

56. The optical connector of item 50, wherein an inner surface the cover faces an inner surface of the housing when the cover is in the open position.

57. The optical connector of item 50, wherein an outer surface of the cover faces an inner surface of the housing when the cover is in the open position.

58. The optical connector of item 50, wherein the inner surface of the cover faces an outer surface of a mating connector when the cover is in the open position and the optical connector is mated with the mating connector.

59. The optical connector of item 50, wherein the outer surface of the cover faces an inner surface of a mating connector when the cover is in the open position when the optical connector is mated with the mating connector.

60. The optical connector of item 50, wherein an inner surface of the cover fits within a recess of a mating connector when the optical connector is mated with the mating connector.

61. The optical connector of item 50, wherein the outer surface of the cover comprises at least one dust well.

62. The optical connector of item 50, wherein cover includes:
a first cover configured to be rotated about a first pivoting axis between a closed position an open position;
a second cover configured to be rotated about a second pivoting axis between a closed position an open position, the first cover rotating in an opposite direction from the second cover.

63. The optical connector of item 50, further comprising a spring that biases the cover in the closed position.

64. The optical connector of item 50, wherein gravity biases the cover in the closed position.

65. The optical connector of item 64, wherein the cover further comprises a weight that facilitates gravity bias in the closed position.

66. The optical connector of item 65, wherein the housing is an injection molded housing and the weight is metal or other relatively dense material embedded in the injected molded housing.

67. The optical connector of item 50, further comprising a pin arranged along the pivoting axis, wherein the metal pin is configured as a pivot for rotation of the cover.

68. The optical connector of item 50, further comprising a stop feature configured to limit further rotation of the cover when the cover is in the closed position.

69. The optical connector of item 50, wherein the lever is configured to engage with an actuating feature of a mating connector, engagement of the lever with the actuating feature of the mating connector causing the cover to rotate about the pivoting axis.

70. The optical connector of item 69, wherein the optical connector is a male connector, the housing of the male connector fits inside an opening of a mating female connector housing and the actuating feature of the female connector is a portion of an edge of a housing of the mating connector that defines the mating connector opening.

71. The optical connector of item 69, wherein the feature is a protrusion that extends from a side of the mating connector.

72. The optical connector of item 50, wherein the connector is hermaphroditic and is configured to mate with a mating connector having a similar hermaphroditic configuration.

73. An optical connector system, comprising:
- a male connector comprising:
- a male housing configured to contain one or more optical ferrules disposed within the housing and accessible through an opening at a mating end of the male housing;
- a cover at or near the mating end of the male housing, the cover configured to be rotated about a pivoting axis between a closed position in which the opening is covered by the cover an open position in which the opening is exposed;
- a cover opening mechanism including a lever extending outside the housing, wherein rotation of the lever causes the cover to rotate about the pivoting axis from a closed position in which the cover extends across the opening to an open position in which the opening is exposed; a female connector comprising:
- a female housing dimensioned to receive at least a mating end portion of the housing of the male connector, the female housing configured to contain one or more optical ferrules disposed within the female housing and accessible through an opening at the mating end of the female housing, wherein during mating of the male connector and the female connector, a portion of a mating end edge of the housing of the female connector is an actuator configured to engage the lever to cause the cover to rotate about the pivoting axis from the closed position to the open position.

74. The connector system of item 73, wherein one or both of the male and female connector housings are angled at the mating end.

75. An optical connector system comprising:
- a male optical connector, comprising a male housing having an opening at a curved mating end of the male housing, the male housing configured to contain one or more optical ferrules disposed within the housing and accessible through the opening, wherein the mating end of the male housing is curved; and
- a female optical connector, comprising:
- a female housing having an opening configured to receive the curved mating end of the housing of the male optical connector, the female housing configured to contain one or more optical ferrules disposed within the housing and accessible through the opening; and
- a cover that extends across the opening of the female housing when the cover is in the closed position, the cover configured to be rotated about a pivoting axis when moving from the closed position to an open position, the curved mating end of the housing of the male connector configured to engage with an outer surface of the cover to cause rotation of the cover from the closed position to the open position during mating.

76. The optical connector system of item 75, wherein;
- a free edge of the cover rotates into the housing of the female connector; and
- the optical ferrules are set back within the housing of the female connector by a distance sufficient to allow the cover to rotate into the female connector housing without obstruction by the ferrules.

77. The optical connector system of item 75, wherein the curve at the mating end of the male connector housing is configured to provide a cam that provides a substantially constant force opening for the cover.

78. The optical connector system of item 75, further comprising a seal between surfaces of the female connector housing and the male connector housing.

79. The optical connector system of item 78, wherein the seal comprises a labyrinth seal.

80. The optical connector system of item 78, further comprising a compliant material between the sealing surfaces.

81. The optical connector system of item 75, further comprising a spring that biases the cover towards the closed position.

82. The optical connector system of item 81, wherein the spring is a torsion spring.

83. The optical connector system of item 75, further comprising a backplane, wherein the female connector is a backplane connector mounted to the backplane.

84. The optical connector system of item 75, wherein an external surface of the cover, when in the closed position protrudes slightly from or is substantially coplanar with the female connector housing at the mating end.

85. The optical connector system of item 75, wherein an outer surface of the male connector housing includes one or more grooves configured to collection of dust.

86. The optical connector system of item 75, wherein the outer surface of the cover includes at least one recess configured for collection of dust.

87. The optical connector system of item 86, wherein the at least one recess comprises a plurality of grooves.

88. The optical connector system of item 75, wherein an outer surface of the cover comprises a dust well and a rim around the dust well such that when the cover is in the open position, the rim makes a seal against the housing of the male connector.

89. The optical connector system of item 88, wherein the dust well includes at least about 70 percent of the total area of the outer surface of the cover.

90. The optical connector system of item 88, wherein the rim include grooves that channel dust towards the dust well as the male connector housing pushes the cover from the closed position into the open position.

91. The optical connection system of item 75 wherein the curved housing of the male connector has a substantially straight first side, a substantially straight second side opposite the first side, and an asymmetrically curved end, wherein the first side is substantially parallel to the second side and the first side is longer than the second side.

92. The optical connection system of item 91, wherein during mating of the female and male connectors, a point at which the first side and the curved end join initially engages the cover proximate to a free edge of the cover which is opposite the pivoting axis.

93. The optical connector system of item 75, wherein the female connector is a backplane connector.

94. The optical connector of item 75, further comprising a stop feature that can be actuated when the cover is in the closed position, the stop feature configured to limit further rotation of the cover from the closed position.

95. An optical connector system comprising:
- a male optical connector, comprising:
- a male housing having an opening at a mating end of the male housing, the male housing configured to contain one or more optical ferrules disposed within the male housing and accessible through the opening; and
- a female optical connector, comprising:
- a female housing having an opening configured to receive the mating end of the housing of the male optical connector, the female housing configured to contain one or more optical ferrules disposed within the female housing and accessible through the opening; and
- a cover that extends across the opening of the female housing when in the closed position, an outer surface of the cover configured to engage the mating end of the male housing and to be rotated about a pivoting axis when moving from the closed position to an open position as the male housing is inserted into the female housing, wherein at least one of the cover and the mating end of the male housing is curved and forms a cam that reduces the variability in mating force of the male and female optical connectors.

96. An optical connector comprising:
a housing having an interior volume configured to contain one or more optical ferrules, the housing comprising:
an opening at a mating end;
a male housing portion having a male portion mating end and a male portion rear end;
a female housing portion having a female portion mating end and a female portion rear end; and
a slot between the male and female portions, the slot separating the mating ends of the male and female portions and extending partially from the male and female mating ends to the male and female rear ends, the slot configured to interlock the connector with a mating connector of substantially similar construction when the connector and the mating connector are mated.

97. The optical connector of item 96, wherein the slot extends about half way between the mating ends and the rear ends.

98. The optical connector of item 96, wherein the mating end of the male portion and the mating end of the female portion are substantially aligned at a mating end of the housing.

99. The optical connector of item 96, wherein the optical ferrules are recessed within the interior volume.

100. The optical connector of item 96, wherein the female housing portion includes a lip that extends along the slot and when the connector is mated with a mating connector having a substantially similar configuration, the lip is disposed within the slot of the mating connector.

101. The optical connector of item 96, wherein the connector housing is a unitary molded piece.

102. The optical connector of item 96, further comprising a cap or plug at the mating end of the connector housing.

103. The optical connector of item 102, wherein the cap or plug comprises a compliant material.

104. A device comprising:
a cap dimensioned to fit over, within, or both over and within an opening of a housing of an optical connector, the housing configured to contain one or more optical ferrules;
a handle configured to be attached to an external surface of the cap; and
a release mechanism configured to release the cap from the handle.

105. The device of item 104, wherein the release mechanism comprises at least one of a twist lock, a threaded, lock, a magnet, a ball and socket, or suction cup.

106. The device of item 104, further comprising a light source attached to the handle and arranged to shine light towards the opening.

107. An optical connector assembly comprising
an optical connector comprising a housing configured to contain one or more optical ferrules disposed within the housing and accessible through an opening at a mating end of the housing;
a cover extending across the opening at or near the mating end; and
a cap disposed over the cover, the cap including a release feature configured to release the cap from a handle that facilitates positioning of the cap.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Various modifications and alterations of the embodiments discussed above will be apparent to those skilled in the art, and it should be understood that this disclosure is not limited to the illustrative embodiments set forth herein. The reader should assume that features of one disclosed embodiment can also be applied to all other disclosed embodiments unless otherwise indicated. It should also be understood that all U.S. patents, patent applications, patent application publications, and other patent and non-patent documents referred to herein are incorporated by reference, to the extent they do not contradict the foregoing disclosure.

The invention claimed is:

1. An optical connector comprising:
a housing configured to contain one or more optical ferrules disposed within the housing and accessible through an opening at a mating end of the housing;
a cover at the mating end, the cover configured to be rotated about a pivoting axis between a closed position an open position; and
at least one cover opening actuator disposed within the housing when the cover is in the closed position and extending at least partially from the opening in the housing when the cover is in the open position, the actuator, when extending at least partially from the opening, configured to engage with an internal face of the cover to cause the cover to rotate about the pivoting axis from the closed position to the open position, wherein the housing includes at least one recess configured to accept a cover of a mating optical connector that is in the open position.

2. The optical connector of claim 1, further comprising at least one spring arranged to bias the cover toward the closed position.

3. The optical connector of claim 1, wherein the cover comprises a first cover and a second cover, wherein a rotational direction of the first cover when moving from the closed position to the open position is opposite from a rotational direction of the second cover when moving from the closed position to the open position.

4. The optical connector of claim 1, wherein:
the cover comprises an upper cover and a lower cover;
a rotational direction of the upper cover when moving from the closed position to the open position is opposite from a rotational direction of the lower cover when moving from the closed position to the open position; and
the housing comprises a first recess in an outer surface of a first side of the housing and a second recess in an outer surface of a second side of the housing opposite the first side, the first recess configured to accept an upper cover of a mating optical connector that is in the open position and the second recess configured to accept a lower cover of the mating optical connector that is in the open position.

5. The optical connector of item 4, wherein the upper and lower covers of the mating connector and first and second recesses of the connector are configured such that engagement of the upper and lower covers of the mating connector with first and second recesses of the connector, respectively, aligns the connector with the mating connector.

6. The optical connector of claim 4, wherein:
the housing includes a first side and an opposing second side with a distance between the first and second sides along a first axis;
the upper cover is attached to an upper portion of the first side; and
the lower cover portion is attached to a lower portion of the second side, the upper cover portion offset from the lower portion along a second axis orthogonal to the first axis, wherein when the upper portion is in the closed position, the upper cover portion extends substantially from the first side of the housing to the second side of the housing and when the lower cover portion is in the closed position, the lower cover portion extends substantially from the second side of the housing to the first side of the housing.

7. The optical connector of claim 1, wherein:
the housing includes a first side and an opposing second side with a distance between the first and second sides along a first axis;
the upper cover is attached to an upper portion of the first side; and
the lower cover is attached to a lower portion of the second side, wherein the upper portion is substantially aligned with the lower portion along a second axis orthogonal to the first axis, and wherein when the upper portion is in the closed position, the upper cover extends from the first side, the lower cover extends from the second side and the upper and lower covers extend to meet or overlap between the first and second sides.

8. The optical connector of claim 1, wherein the housing comprises a forward housing and a rear housing, the forward housing including the mating end and the opening, wherein movement of the forward housing relative to the rear housing causes the at least one actuator to extend at least partially from the opening, to engage with the cover, and to cause the cover to rotate from the closed position to the open position.

9. An optical connector comprising:
a housing configured to contain one or more optical ferrules disposed within the housing proximate to an opening at a mating end of the housing;
at least one track;
a cover disposed across the opening at the mating end when the cover is in a closed position, the cover configured to bend or hinge along the track as the cover moves from the closed position in which the cover covers the opening to an open position in which the opening is exposed; and
a cover opening feature coupled to the cover and configured to be operated to cause the cover to move from the closed position to the open position.

10. The optical connector of claim 9, wherein the cover opening feature is configured to engage with an actuator of a mating connector during mating of the connector with a mating connector, engagement of the cover opening feature and the actuator causing the cover to move from the closed position to the open position during the mating.

11. The optical connector of item 9, further comprising at least one spring arranged to bias the cover toward the closed position.

12. The optical connector of claim 9, wherein the cover opening feature comprises a first and a second cover opening feature disposed at opposite edges of the cover or a single opening feature disposed at a central location of one edge of the cover.

13. The optical connector of claim 9, wherein, in the closed position, the cover is disposed within the housing such that an outer surface of the cover faces an inner surface of the housing.

14. The optical connector of claim 9, wherein:
the cover comprises a first cover and a second cover, the first cover comprises a flexible material or sections hinged together that allow the first cover to bend around a first track in a first direction as the first cover moves from the closed position in which the first cover covers a first portion of the opening to an open position in which the first cover exposes the first portion of the opening; and
the second cover comprises a flexible material or sections hinged together that allow the second cover to bend around a second track in a second direction as the second cover moves from the closed position in which the second cover covers a second portion of the opening to an open position in which the second cover exposes the second portion of the opening; and
the opening feature comprises a first opening feature coupled to the first cover and a second opening feature coupled to the second cover.

15. The optical connector of claim 9, wherein the cover translates while moving along the track.

16. The optical connector of claim 9, wherein the track includes two portions disposed along different axes.

17. The optical connector of claim 9, wherein the track includes two portions disposed along non-parallel axes.

18. An optical connector comprising:
a housing configured to contain one or more optical ferrules disposed within the housing proximate to an opening at a mating end of the housing; and
a fan fold cover comprising at least two fan sections with a hinge between the two fan sections, one of the two fan sections attached to the housing at a pivoting axis.

19. The optical connector of claim 18, further comprising at least one spring arranged to bias the cover toward the closed position.

20. The optical connector of claim 18, further comprising:
a cover opening mechanism coupled to the cover, the cover opening mechanism comprising:
a cover opening feature; and
a cover opening linkage coupled to the cover and the cover opening feature, wherein movement of the cover opening feature and the cover opening linkage causes the cover to move from the closed position to the open position.

21. The optical connector of claim 18, further comprising at least one actuator configured to engage a cover opening mechanism of a mating cover during mating of the connector with the mating connector, engagement of the actuator with the cover opening mechanism of the mating cover causing the mating cover to move from the closed position to the open position.

22. The optical connector of claim 18, wherein the cover is arranged such that gravity biases the cover in the closed position, wherein the optical connector further comprises a weight at a free edge of the fan fold cover that facilitates gravity biasing of the cover in the closed position.

* * * * *

UNITED STATES PATENT AND TRADEMARK OFFICE
CERTIFICATE OF CORRECTION

| | | |
|---|---|---|
| PATENT NO. | : 11,086,083 B2 | Page 1 of 1 |
| APPLICATION NO. | : 16/064575 | |
| DATED | : August 10, 2021 | |
| INVENTOR(S) | : Alexander Mathews | |

It is certified that error appears in the above-identified patent and that said Letters Patent is hereby corrected as shown below:

In the Claims

<u>Column 28</u>
Line 28, In Claim 1, after "position", insert -- and --.

<u>Column 29</u>
Line 61, In Claim 11, delete "item" and insert -- claim --, therefor.

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*